United States Patent [19]

Harris et al.

[11] Patent Number: 5,228,116
[45] Date of Patent: Jul. 13, 1993

[54] KNOWLEDGE BASE MANAGEMENT SYSTEM

[75] Inventors: Larry R. Harris, Concord; Jeffrey M. Hill; Dayton Marcott, Watertown, all of Mass.; Timothy F. Rochford, East Greenwich, R.I.

[73] Assignee: Aicorp., Inc., Waltham, Mass.

[21] Appl. No.: 704,704

[22] Filed: May 17, 1991

Related U.S. Application Data

[63] Continuation of Ser. No. 492,382, Mar. 8, 1990, abandoned, which is a continuation of Ser. No. 219,980, Jul. 15, 1988, abandoned.

[51] Int. Cl.$^5$ .............................................. G06F 15/18
[52] U.S. Cl. ................................. 395/54; 364/DIG. 1; 364/274.5; 364/274.7; 364/282.1; 364/DIG. 2; 364/972.3; 364/974.6; 395/64; 395/600
[58] Field of Search ........ 364/513, 148, 200 MS File, 364/900 MS File, DIG. 1 MS File, DIG. 2 MS File; 395/11, 12, 54, 64, 77, 919, 600

[56] References Cited

U.S. PATENT DOCUMENTS

| | | | |
|---|---|---|---|
| 4,095,982 | 6/1986 | Burt | 364/300 |
| 4,628,435 | 12/1986 | Tashiro et al. | 364/513 X |
| 4,644,479 | 2/1987 | Kemper et al. | 364/513 X |
| 4,648,044 | 3/1987 | Hardy et al. | 364/513 |
| 4,658,370 | 4/1987 | Erman et al. | 364/900 X |
| 4,670,848 | 6/1987 | Schramm | 364/513 |
| 4,730,259 | 3/1988 | Gallant | 364/513 |
| 4,747,148 | 5/1988 | Watanabe et al. | 382/10 |
| 4,752,890 | 6/1988 | Natarajan et al. | 364/513 |
| 4,754,409 | 6/1988 | Ashford et al. | 364/513 |
| 4,763,277 | 8/1988 | Ashford et al. | 364/513 |
| 4,779,208 | 10/1988 | Tsuruta et al. | 364/513 |
| 4,783,752 | 11/1988 | Kaplan et al. | 364/513 |
| 4,839,822 | 6/1989 | Dormond et al. | 364/900 X |
| 4,849,905 | 7/1989 | Loeb et al. | 364/513 |
| 4,939,668 | 7/1990 | Brown et al. | 364/468 X |
| 5,006,992 | 4/1991 | Skeirik | 364/148 X |

OTHER PUBLICATIONS

Dialog service, list of patents, Sep. 1988.
Dialog service, Teknowledge references; May 1990.
Lexis Search; May 1990.
"Intellicorp Unveils KEE/C Integration Toolkit", *Intellinews*, Jul., 1987.
Proposal for KBMS Partnership, AICorporation Feb. 1987, May 1988.
Aion Corporation references; date unknown.
Harmon, "Tools for Mainframes", *Expert Systems Strategies*, No. 10; 1987.
Brownston, "Programming Expert Systems in OPS5", *An Introduction to Rule-Based Programming*, Addison-Wesley, 1985.
Morris et al., "Design Overview of the Nail! System", date unknown.
Ullman, "Implementation of Logical Query Languages for Databases", ACM Trans. on Database Systems, vol. 10, No. 3, Sep., 1985, pp. 290–321.
Stonebrooker, et al., "The Design of Postgres", Dept. of Electrical Engineering and Computer Sciences, Univ. Calif., 1986 ACM.
Forgy et al., "Rete:", AI Expert, Jan. 1987, vol. 2, No. 1.

*Primary Examiner*—Joseph Ruggiero
*Attorney, Agent, or Firm*—Fish & Richardson

[57] ABSTRACT

An inference engine in a knowledge base system may be invoked by an application program (e.g., a COBOL program), by arranging to detect, in the program, instructions whose syntax complies with the syntax requirements of a predefined data base manipulation language (e.g., SQL), and then executing the instruction by invoking the inference engine. As a result, the application programmer can implicitly and transparently take full advantage of the facilities of the inference engine using simple, known data base manipulation language statements. In other aspects, the "if (condition)" side of an inference rule triggers the inference engine to execute a sequence of steps based on a class of facts referred to in the condition and based on prestored information identifying the storage scheme for that class of facts; facts retrieved from an external data base are filtered to eliminate unneeded facts, before transducing the remaining, needed facts into the temporary storage space; and the knowledge base system exercises control of the cursor control mechanism of an external data base in order to retrieve facts one by one as needed by the inference engine.

10 Claims, 20 Drawing Sheets

TITLE BAGGSQL;

OBJECT INVENTORY, AIC40X.BAGINV, OBJECT_TYPE = SQL;
    ATTRIBUTE INAME, NAME, TYPE=ALPHABETIC, WIDTH=10, INDEXED=YES;
    ATTRIBUTE SIZE, TYPE=ALPHABETIC, WIDTH=10;
        VALUE LARGE;
        VALUE MEDIUM;
        VALUE SMALL;
    ATTRIBUTE CONTAINER, TYPE=ALPHABETIC, WIDTH=10;
        VALUE BOTTLE;
        VALUE BOX;
        VALUE CAN;
        VALUE FRUIT;
    ATTRIBUTE FROZEN STATUS, FROZEN, TYPE=ALPHABETIC, WIDTH=10,
        HEADING=(FROZEN, STATUS);
        VALUE FROZEN, YES;
    ATTRIBUTE VOLUME, TYPE=NUMERIC, WIDTH=10;
    ATTRIBUTE QUANTITY, TYPE=NUMBERIC, WIDTH=10;
    ATTRIBUTE PRICE, TYPE=DECIMAL, WIDTH=(7,2), SCALE=2;
    ATTRIBUTE COST, TYPE=DECIMAL, WIDTH=(7,2), SCALE=2;
OBJECT ITEM, OBJECT_TYPE = KDB, TEMPORARY=YES, ACTIVE=YES;
    ATTRIBUTE NAME, TYPE=ALPHABETIC, WIDTH=10;
        VALUE CHIPS;
        VALUE COKE;
        VALUE CORN;
        VALUE GUM;
        VALUE ICE CREAM;
        VALUE MILK;
        VALUE PEAS;
        VALUE PEPSI;
        VALUE SOAP;
        VALUE TUNA;
        VALUE WATERMELON;
    ATTRIBUTE INBAG, TYPE=NUMERIC, WIDTH=2, SUMMABLE=NO, COMPUTABLE=NO;
OBJECT BAG, OBJECT_TYPE = KDB, TEMPOARARY=YES, ACTIVE=YES;
    ATTRIBUTE BAGNUM, TYPE=NUMERIC, WIDTH=2;
    ATTRIBUTE REMVOL, TYPE=NUMERIC, WIDTH=2;
    ATTRIBUTE LARGE CNT, TYPE=NUMERIC, WIDTH=2, HEADING=(LARGE, CNT);
    ATTRIBUTE BOTTLE CNT, TYPE=NUMERIC, WIDTH=2, HEADING=(BOTTLE, CNT);
OBJECT GLOBAL, OBJECT_TYPE = KDB, SINGLETON=YES, TEMPORARY=YES,
    ACTIVE=YES;
    ATTRIBUTE STEP, TYPE=ALPHABETIC, WIDTH=15;
    ATTRIBUTE NUMBAGS, TYPE=NUMERIC, WIDTH=2;
QUALIFIER I, (INVENTORY);
QUALIFIER II, (INVENTORY);
QUALIFIER T, (ITEM);
QUALIFIER TT, (ITEM);
QUALIFIER B, (BAG);
QUALIFIER BB, (BAG);
PACKET CHECK-ORDER;
PACKET BAG-LARGE;
PACKET BAG-MEDIUM;

FIG. 2A

```
PACKET BAG-SMALL;
PACKET MAIN;
PACKET PRINT-REPORT;
PACKET BAGIT (bbb: BAG, iii: ITEM, vvv: INVENTORY);
REQUEST ENTER ORDER ;
REQUEST BAGGING REPORT ;
SEARCH UNBAGGED, (INBAG = UNAVAILABLE);
SEARCH FITS, (VOLUME <= REMVOL);
SEARCH FEW LARGE, (LARGE CNT <6);
CHANGE OBJECT INVENTORY, AIC40x.BAGINV ,KEY=INAME ,DEFAULT=INAME ;
CHANGE OBJECT ITEM,KEY=NAME ,DEFAULT=(NAME, INBAG) ;
CHANGE OBJECT BAG,
        WHEN_CREATED=(NUMBAGS = NUMBAGS + 1;
                      BAGNUM = NUMBAGS;                          }— 72
                      PRINT 'OPENING NEW BAG #', NUMBAGS;)
        KEY=BAGNUM ,
        DEFAULT=(BAGNUM, REMVOL, LARGE CNT, BOTTLE CNT) ;
    CHANGE ATTRIBUTE REMOVL,DEFAULT_VALUE=48 ;
    CHANGE ATTRIBUTE LARGE CNT,DEFAULT_VALUE=0 ;
    CHANGE ATTRIBUTE BOTTLE CNT,DEFAULT_VALUE=0 ;
CHANGE OBJECT GLOBAL,KEY=STEP ,DEFAULT=STEP ;
    CHANGE ATTRIBUTE NUMBAGS,DEFAULT_VALUE=0 ;
CHANGE PACKET CHECK-ORDER,AGENDA_TYPE=STANDARD ,LINES_PER_RULE=3 ,
        AGENDA_CONDITION=(STEP = 'CHECK ORDER') ,
        ENTRY_ACTION=(PRING 'CHECKING ORDER';) ,
        EXIT_ACTION=(STEP = 'BAG LARGE';) ;
    RULE B1,
        (IF CHIPS &
            NOT EXISTS (PEPSI)
64—     THEN CREATE PEPSI ITEM;
                PRINT 'ADDING PEPSI TO ORDER';) ,
        AUTHOR=ARDLRH2 ,
        DATE_LAST MODIFIED=19870717 ;
CHANGE PACKET BAG-LARGE,
        AGENDA_TYPE=STANDARD ,
        LINES_PER_RULE=5 ,           68
        AGENDA_CONDITION=(STEP = 'BAG LARGE')
        RULE_PREFIX=UNBAGGED &
                    LARGE ,
        ENTRY_ACTION=(PRINT 'BAGGING LARGE ITEMS';) ,
        EXIT_ACTION=(STEP = 'BAG MEDIUM';) ;
    RULE B3,
        (IF BOTTLE &
            FEW LARGE &                                           — 66
            FITS
         THEN CALL BAGIT(BAG, ITEM, INVENTORY);) ,
        AUTHOR-ARDLRH2 ,
        DATE_LAST_MODIFIED=19880115 ;
    RULE B4,
        (IF FEW LARGE &
            FITS
         THEN CALLBAGIT(BAG, ITEM, INVENTORY);) ,
        AUTHOR=ARDLRH2 ,
        DATE_LAST_MODIFIED=19880115 ;
```

FIG. 2B

```
RULE B5,(OTHERWISE CREATE BAG;) ,AUTHOR=ARDLRHE ,
    DATE_LATE_MODIFIED=1987017 ;
CHANGE PACKET BAG-MEDIUM,
    AGENDA_TYPE=STANDARD ,
    LINES_PER_RULE=4 ,
    AGENDA_CONDITION=(STEP = 'BAG MEDIUM') ,
    RULE_PREFIX=UNBAGGED &
            MEDIUM ,
    ENTRY_ACTION=(PRINT 'BAGGING MEDIUM ITEMS';) ,
    EXIT_ACTION=(STEP = 'BAG SMALL';) ;
RULE B7,
    (IF FROZEN
     THEN PRINT 'WRAPPING', NAME;) ,
    AUTHOR=ARDLRH2 ,
    DATE_LAST_MODIFIED=1987017 ;
RULE B8,
    (IF LARGE CNT = 0 &
        FITS
     THEN CALL BAGIT(BAG, ITEM, INVENTORY);) ,
    AUTHOR=ARDLRH2 ,
    DATE_LAST_MODIFIED=19880115 ;
RULE B9,(OTHERWISE CREATE BAG;) ,AUTHOR=ARDLRH2 ,
    DATE_LAST_MODIFIED=19870717 ;
CHANGE PACKET BAG-SMALL,
    AGENDA_TYPE-STANDARD ,
    LINES_PER_RULE=4 ,
    AGENDA_CONDITION=(STEP = 'BAG SMALL') ,
    RULE_PREFIX=UNBAGGED &
            SMALL ,
    ENTRY_ACTION=(PRINT 'BAGGING SMALL ITEMS';)
    EXIT_ACTION=(STEP = 'PRINT REPORT';) ;
RULE B11,
    (IF BOTTLE CNT = 0 &
        FITS
     THEN CALL BAGIT(BAG, ITEM, INVENTORY);) ,
    AUTHOR=ARDLRH2 ,
    DATE LAST MODIFIED=19880115 ;
RULE B13,(OTHERWISE CREATE BAG;) ,AUTHOR=ARDLRH2 ,
    DATE_LAST_MODIFIED=19870717 ;
CHANGE PACKET MAIN,
    AGENDA_TYPE=STANDARD ,
    LINES_PER_RULE=1 ,
    EXIT_ACTION=(PERFORM ENTER ORDER;
            STEP = 'CHECK ORDER';) ;
CHANGE PACKET PRINT-REPORT,AGENDA_TYPE=STANDARD ,LINES_PER_RULE=4 ,
    AGENDA_CONDITION=(STEP = 'PRINT REPORT') ,
    ENTRY_ACTION=(PERFORM BAGGING REPORT;) ,
    EXIT_ACTION=(STEP = 'DONE';) ;
CHANGE PACKET BAGIT,AGENDA_TYPE=STANDARD ,LINES_PER_RULE=1 ,
    ENTRY_ACTION=(PRINT 'PUTTING ', III.NAME, ' IN BAG ',
    BBB.BAGNUM;) ;
  RULE INSERT,(III.INBAG = BBB.BAGNUM;) ,AUTHOR=ARDLRH2 ,
    DATE_LAST_MODIFIED=19880115 ;
  RULE DECREMENT, (BBB.REMVOL = BBB.REMVOL - VVV.VOLUME;) ,
```

FIG. 2C

```
                AUTHOR=ARDLRH2 ,DATE_LAST_MODIFIED=19880115 ;
         RULE CNTLARGE,
                  (IF VVV.LARGE
                    THEN BBB.LARGE CNT=BBB.LARGE CNT + 1;),
                  AUTHOR=ARDLRH2 ,
                  DATE_LAST_MODIFIED=19880115 ;
              RULE CNT BOTTLE,
              (IF VVV.BOTTLE
                 THEN BBB.BOTTLE CNT = BBB.BOTTLE CNT + 1;) ,
          AUTHOR=ARDLRH2 ,
          DATE_LAST_MODIFIED=19880115 ;
CHANGE REQUEST ENTER ORDER, CREATE NAME. ;
OPTIONS ,PROCESS=CREATE ;
AREA DETAIL,ROWS=8 ;
IMAGE 'Enter the items you wish to have bagged one item at a time.',
    TYPE=LITERAL ,ROW=1 ,COLUMN=1 ,FLOAT=NO ;
IMAGE 'The items for sale are:',TYPE=LATERAL ,ROW=3 ,COLUMN=1 ,
      FLOAT=NO ;
IMAGE
      'Chips, Coke, Pepsi, Corn, Gum, Ice Cream, Milk, Peas, Soap, Tuna, Watermelon',TYPE
      FLOAT=NO ;
IMAGE 'NAME:',TYPE=LITERAL ,ROW=6 ,COLUMN=2 ,FLOAT=NO ,
      CONNECT ATTRIBUTE=NAME ;
IMAGE NAME,ROW=6 ,COLUMN=8 ,FLOAT=NO ,WIDTH=10 ,
      SUPPRESS_SORT_DUPLICATES=NO ;
IMAGE 'Hit the PF15 key when finished.',TYPE=LITERAL ,ROW=8 ,COLUMN=1 ,
      FLOAT=NO ;
CHANGE REQUEST BAGGING REPORT,
         (PRINT A REPORT OF THE DETAILED NAME, SIZE, VOLUME, CONTAINER, BAGNUM,
             REMVOL, LARGE CNT, BOTTLE CNT AND INBAG
          SORTED BY BAGNUM AND REMVOL OF ALL INVENTORY, ANY BAG AND ANY ITEM
             WITH INBAG = BAGNUM.) ;
LINK ITEM-INV,(NAME = INAME) ,LINK_TYPE=ONE TO ONE ,DEFAULT_PATH=YES ,
USED FOR RULES=YES;
END;
```

FIG. 2D

"SALARY = $30,000 AND STATE = NEW HAMPSHIRE?"

"LIST NAMES OF PEOPLE OWNING RED CARS"
[ (PERSON) PERSON ID = (CAR) OWNER ID]

KNOWLEDGE BASE MANAGEMENT SYSTEM

This is a continuation of copending application(s) Ser. No. 07/492,382 filed on Mar. 8, 1990, abandoned in which is a continuation of Ser. No. 07/219,980 filed on Jul. 15, 1988 abandoned.

BACKGROUND OF THE INVENTION

This invention relates to knowledge base systems.

In such systems, prestored rules and facts form a knowledge base from which useful inferences and conclusions may be drawn by an inference engine.

Commercially available knowledge base system shells include such an inference engine together with facilities that aid the system developer in defining the rules and facts for a given application, and an interface that enables a user to query the system from an interactive terminal.

Some of the facts required for a given application may be available in an already established data base; and the knowledge base system may need to use those facts in responding to a query.

Information is stored and retrieved in data bases typically via a query language such as SQL (structured query language) which, for example, can be used to specify criteria for searching the data base to locate a desired fact.

SUMMARY OF THE INVENTION

In general, in one aspect, the invention features enabling an inference engine in a knowledge base system to be invoked by an application program (e.g., a COBOL program), by arranging to detect, in the program, instructions whose syntaxes comply with the syntax requirements of a predefined data base manipulation language (e.g., SQL), and then executing the instructions by invoking the inference engine. As a result, the application programmer can implicitly and transparently take full advantage of the facilities of the inference engine using simple, known data base manipulation language statements.

Preferred embodiments of the invention include the following features. The data base manipulation language includes a type of instruction whose normal function is to insert a record (occurrence) into a data base; and such an instruction, when included in the application program, is executed by passing the record to the inference engine for assertion in a set of inference rules within the knowledge base system. The inference rules are compiled in a Rete network of nodes and the inference engine applies the value by asserting it at the top node of the network. The data base manipulation language also has a type of instruction whose normal function is to state a query seeking records located in a data base; and such an instruction, when included in the application program, is executed by passing the query to the inference engine for response based in part on a set of inference rules within the knowledge base. The data base manipulation language also has a type of instruction whose normal function is to update a data base field or column with a value; and such an instruction, when included in the application program, is executed by passing the attribute and value to the inference engine for assertion in a set of inference rules in the knowledge base system. The data base manipulation language also has a type of instruction whose normal function is to delete a data base occurrence or record from the data base; and such an instruction, when included in the application program, is executed by passing the occurrence to the inference engine for assertion of the deletion in a set of inference rules in the knowledge base system. In some embodiments, the data base manipulation language instructions are executed without referring to an actual external data base. Also responses to the instructions may be delivered back to the application program in accordance with action nodes of the Rete network.

In general, another aspect of the invention features enabling an inference engine in a knowledge base system to test the "if (condition)" portion of a rule which refers to a class of facts (i.e., an object), regardless of the storage scheme under which the facts have been stored; prior to testing the condition, information is stored identifying the storage scheme for each class of facts; when a class is named in the "if (condition)" portion of the rule, the inference engine is caused to execute a sequence of steps directed to retrieval of the facts and that sequence of steps is selected based on the class, and on the information identifying the storage scheme. As a result, the developer who prepares the rules may do so merely by naming classes of facts without regard to the ultimate location where, or storage scheme under which, any particular class of facts may be stored.

Preferred embodiments of the invention include the following features. One of the storage schemes includes storage, in an external data base, of a class of facts which is to be used only temporarily by the inference engine; the sequence of steps is part of a network of steps which enable retrieval of facts corresponding to each rule of the knowledge base system; and the steps in the network are organized by clustering together steps which involve retrieval of facts from a given external data base. The steps are also organized so as to defer execution of steps which cause retrieval of facts from the external data base until other steps required for testing the "if (condition)" side of the rule have been executed.

In another general feature of the invention, the facts needed from the external data base are stored in conjunction with other, unneeded facts; the inference engine has an associated temporary storage space for storing the temporarily needed facts after retrieval from the data base; both the needed and unneeded facts are fetched from the data base; but the needed facts are not transduced into the temporary storage spaced until the unneeded facts are filtered out. Thus, the temporary storage space does not become overloaded with unneeded facts.

In another general feature of the invention, a series of temporarily needed, related facts are available in successive record locations of an external data base; the external data base management system includes a cursor control mechanism for pointing to successive record locations; and the knowledge base system exercises control of the cursor control mechanism to retrieve the facts one by one as needed by the inference engine. In that way, the knowledge base system does not become overloaded by a requirement to retrieve multiple records at once.

Other advantages and features will become apparent from the following description of the preferred embodiment, and from the claims.

DESCRIPTION OF THE PREFERRED EMBODIMENT

We first briefly describe the drawings.

FIGS. 2A through 2D are successive pages of a listing of an example of an expert system for aiding the bagging of grocery items.

STRUCTURE AND OPERATION

Figure 1:
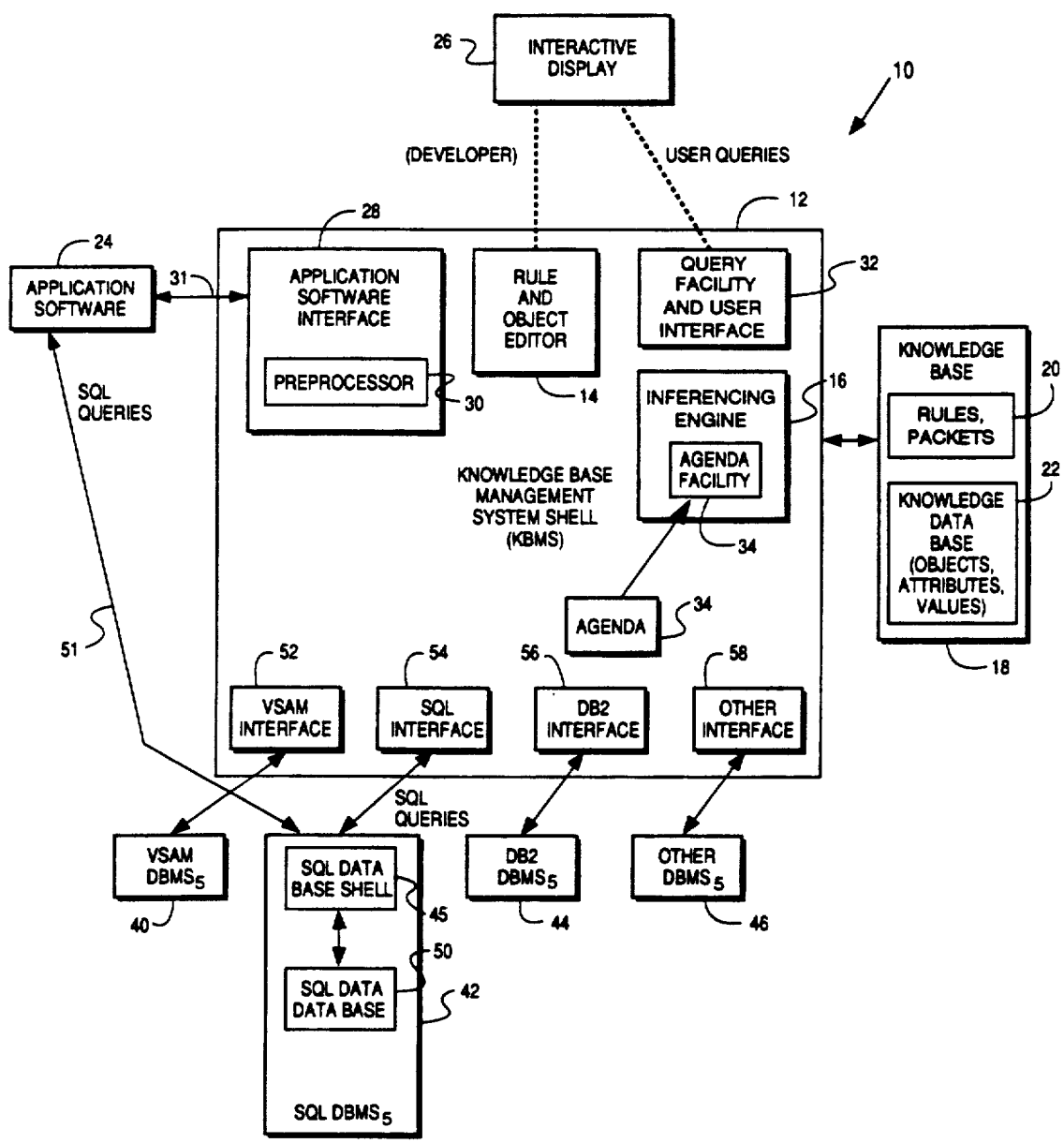
FIG. 1 is a block diagram of a knowledge base management system.

Referring to FIG. 1, a knowledge base management system (KBMS) 10 includes a KBMS shell 12 in the form of a compiled software program written in the 'C' language and stored in the memory of a computer. The KBMS shell has a rule and object editor 14 which converts the rules and facts defined by a knowledge base system developer into a form useful to an inferencing engine 16.

Rules and groups of rules (called packets) 20 are stored in a knowledge base 18. The knowledge base 18 also includes a knowledge data base 22 which, among other things, stores facts loaded by the system developer or in some cases by the user.

Once an application has been developed, queries may be directed to the system either from application software (e.g., a COBOL program) 24, or by a user via an interactive terminal 26.

In the case of application programs, queries are embedded, for example, in the COBOL program in the form of instructions that conform to the syntax of SQL. An application software interface 28 includes a preprocessor 30 which converts the SQL queries to a series of instructions that enable the queries to be passed via a link 31 to KBMS when the appropriate place is reached in the application software. As discussed below, even though the SQL instructions in the application software are phrased as simple data base queries, the KBMS treats them as inputs to the knowledge base and, via the inference engine, automatically (and transparently to the programmer who wrote the application software) applies the full power of the knowledge base system in executing the instruction.

In the case of user queries from an interactive terminal, a query facility and user interface 32 aids the user and converts the queries to a form which can be handled by KBMS.

The inferencing engine includes an agenda facility 34 which schedules the execution of actions appearing on an agenda 35. Actions are entered onto the agenda from the inference (action) sides of rules when the condition sides of the rules have been satisfied.

Facts needed by the inferencing engine are stored in the knowledge data base either as facts entered by the system developer or the user, or as facts fetched into the knowledge data base from external data bases managed by external data base management systems, for example, VSAM, SQL, DB2, and others 40, 42, 44, 46. The SQL DBMS, for example, includes a data base shell 48 (which provides a variety of facilities including interpretation of queries, and organization and management of the data base) and a data base 50 in which the facts are stored. The KBMS shell includes VSAM, SQL, DB2, and other interfaces 52, 54, 56, 58 which enable (i) queries to be passed to the DBMSs in the appropriate form to retrieve needed facts, (ii) the retrieved facts to be provided to the KBMS shell in a useful form, and (iii) facts to be stored in the data base. For example, the SQL interface sends queries to the SQL DBMS in the SQL language, just as the application software 24 may do via link 51. Different DBMSs provide different levels of management and support for the data bases contained within them, and KBMS structures the queries to various data bases in a way that takes advantage of facilities available in the external DBMSs.

As discussed below, the rule and object editor 14 also structures the queries to the external data bases in a manner that is efficient and transparent to the developer who writes the rules or to the user who phrases the queries. All that is required of the developer is initially to identify the data base where a given fact will be found. Thereafter, any reference to that fact will automatically be handled via the appropriate data base.

Facts of interest in the system are organized in so-called objects, which are like files.

Referring to FIG. 2A, for example, in a knowledge base system whose function is to aid the bagging of groceries at the checkout counter of a supermarket, each object (e.g., object 60) represents a file of information needed by the knowledge system. Each object is defined by the developer and may be thought of as an initially empty table in which occurrences (entries) may be placed in rows. Each column of the table represents an attribute which characterizes the occurrences. For each attribute there may be a number of possible values. Thus, each cell of the table may contain a value for the corresponding attribute and occurrence.

For example, object 60 is called 'item' and keeps track of which bag contains each grocery item that has been purchased. Thus, each occurrence in the object named item has two attributes, one being the name of a purchased item, and the other the number of the bag (inbag) where it is located. The possible values for each attribute may be defined in advance. In the example of FIG. 2A, there are eleven possible item names, including chips, coke, corn, etc.; the bag number (inbag) may be any two-digit number (type=numeric, width=2).

Initially the object named item will have no occurrences, but as items are purchased and bagged, the name of each item and the bag number are entered in the object. (Other objects—for example, object 62, called inventory, which lists information about every grocery item in inventory—may, of course, be loaded with occurrences by the developer before the knowledge base system is made available to the user.) A load command is available for the developer to load occurrences, and loading may also be done by filling entries in an external data base.

In defining a given object, the developer specifies whether the object is to be found in an external data base or in the knowledge data base (KDB). In FIG. 2A, for example, the object named item is stored in the KDB (object-type=KDB), while the object named inventory (object 62) is stored in an SQL data base (object-type=SQL) in table AIC40X.BAGINV.

The developer also controls a number of other parameters which help to define the object and its role in the system as follows.

One parameter is whether or not the object is active. An active object is one which will trigger testing of all rules which refer to the object every time there is a change in one of its values. An inactive object—for example one stored in an external data base—is one which will not be monitored continually for changes in its values.

Another parameter is whether the object is temporary or not. In the example, the object named item it temporary, indicating that the occurrences for that item are generated and stored temporarily during a user session, not permanently in advance, and are cleared at the end of the session.

A third parameter defines whether there is a key attribute for searching (such as an employee ID number).

An object definition may also include a clause that cause certain actions to be taken either when an occurrence is created in the object, when an occurrence is deleted from the object, or whenever an occurrence of the object is called for, if no occurrences then exist. For example, lines 72 on FIG. 2B indicate that when a bag is created in the object named bag, the number of bags should be incremented by 1 and the phrase "opening new bag #_" should be printed. Similar actions can be attached to attribute definitions to be triggered when assigned or when needed.

The developer also defined certain characteristics of each attribute of an object, for example, its type and width, and whether or not it is active.

Referring to FIG. 2B, in phrasing a rule for entry into the system, the operative part of, for example, rule B1 (64) begins with an IF clause which sets forth a Boolean expression that must be tested to see if the rule should be fired; here the rule is fired if the grocery order includes an item chips but does not include an item Pepsi. The THEN clause in the rule specifies what action to take if the condition is met; in this case, a new item Pepsi is created and the phrase "Adding Pepsi to Order" is printed.

Related rules may be organized in packets. Referring to FIGS. 2B and 2C, packet 66, called bag large, includes three rules whose purpose is to decide how to handle a large grocery item that is ready for bagging. If the item is a bottle and there are fewer than 6 large items in the bag and the item fits in the present bag (its volume is less than the remaining bag volume), then the item is put in the current bag (rule B3). The item is also bagged if it fits and there are fewer than 6 large items in the bag (rule B4). Otherwise the item is put in a new bag (rule B5).

In rules B3, B4, B5, the actions taken if the conditions are met include printing a phrase, creating an item, and calling another packet. Other actions that could be taken include, for example, calculating an expression or changing a value of an attribute of an occurrence in some object.

Each packet definition begins with a set of parameters by which the developer characterizes the packet. The parameter agenda_condition indicates what condition will trigger the packet. In packet 66, for example, the agenda_condition is that the next step is to bag a large item (line 68). The rule_prefix (line 70) is a condition that is implicitly added to the left side of each rule. Here each rule is presumed to begin with a test of the condition that the item is large and unbagged. The entry_action and exit_action parameters specify actions to be taken when entering or exiting the packet.

Thus, what distinguishes a packet from a rule are simply the common elements of a packet that will be applied to the rules of that packet as a group.

The rules, objects, and other information as entered by the developer in the form shown in FIG. 2 present a complete and concise specification of what the system is to do, but it is necessary to convert that specification into a structure that can be efficiently executed by performing all of the needed searches and executing the appropriate rules using facts fetched from either the KDB or an external data base.

The basic data structure used to control the operation of the knowledge base system is a node. Nodes typically refer to primitive elements of tests, to objects and attributes, to relationships, and to actions to be taken when test conditions are satisfied. Nodes usually refer to other nodes and in that way they define sequences of steps to be taken in analyzing the rules of the expert system.

Figure 3:
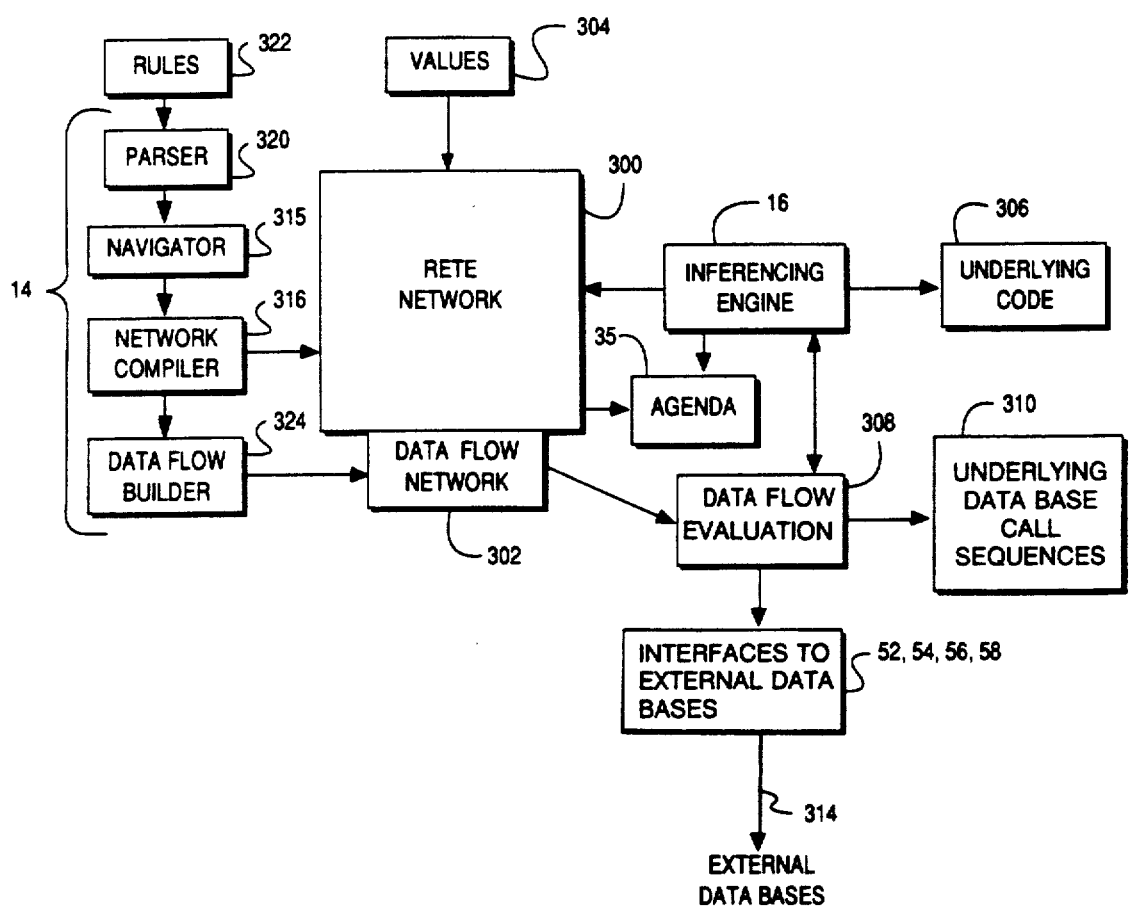
FIG. 3 is a more detailed block diagram of portions of the knowledge base management system of FIG. 1.

Referring to FIG. 3, the nodes and the cross-references define a Rete network (which controls the testing of rules based on available facts and the triggering of actions when test conditions are met) and a related data flow network 302, which controls interaction with the external data bases. Values 304 that become specified, changed, or deleted at the beginning of or during a user session are dropped into the top node of the Rete network. The inferencing engine 16 causes the values to flow through the network, determines when actions may be taken as a result of conditions having been met, loads the actions into the agenda, and after all processing has been completed in the Rete network, manages the execution of the actions listed on the agenda. Execution of actions may produce additions, changes, or deletions of values which are again dropped into the Rete network, and the process is repeated.

In executing the steps represented by the Rete network nodes, inferencing engine 16 refers in each case to underlying program instructions that implement each type of step.

Similarly, a data flow evaluator 308 carries out the steps called for by the nodes of the data flow network 302 using underlying data base call sequences 310, all in a manner to be described.

The data flow evaluator 308 passes data base call sequences 310 to external data bases interfaces 52, 54, 56, 58 which manage the communication links 314 to those external data bases.

The nodes of the Rete network are compiled by a network compiler 316 based on node sequences originally generated by a navigator 318. Navigator 318 works from the output of a parser 320 whose main function is to analyze rules 322 and break each rule into primitive units. Once the network compiler 316 has completed its work, for each node of the Rete network that requires access to an external data base, a data flow builder 324 creates and organizes the nodes that form the data flow network.

The Rete network is organized as a tree of nodes which represent (a) the primitive tests that make up the rules, and (b) the actions that are triggered by rules whose conditions have been satisfied.

Figure 4:
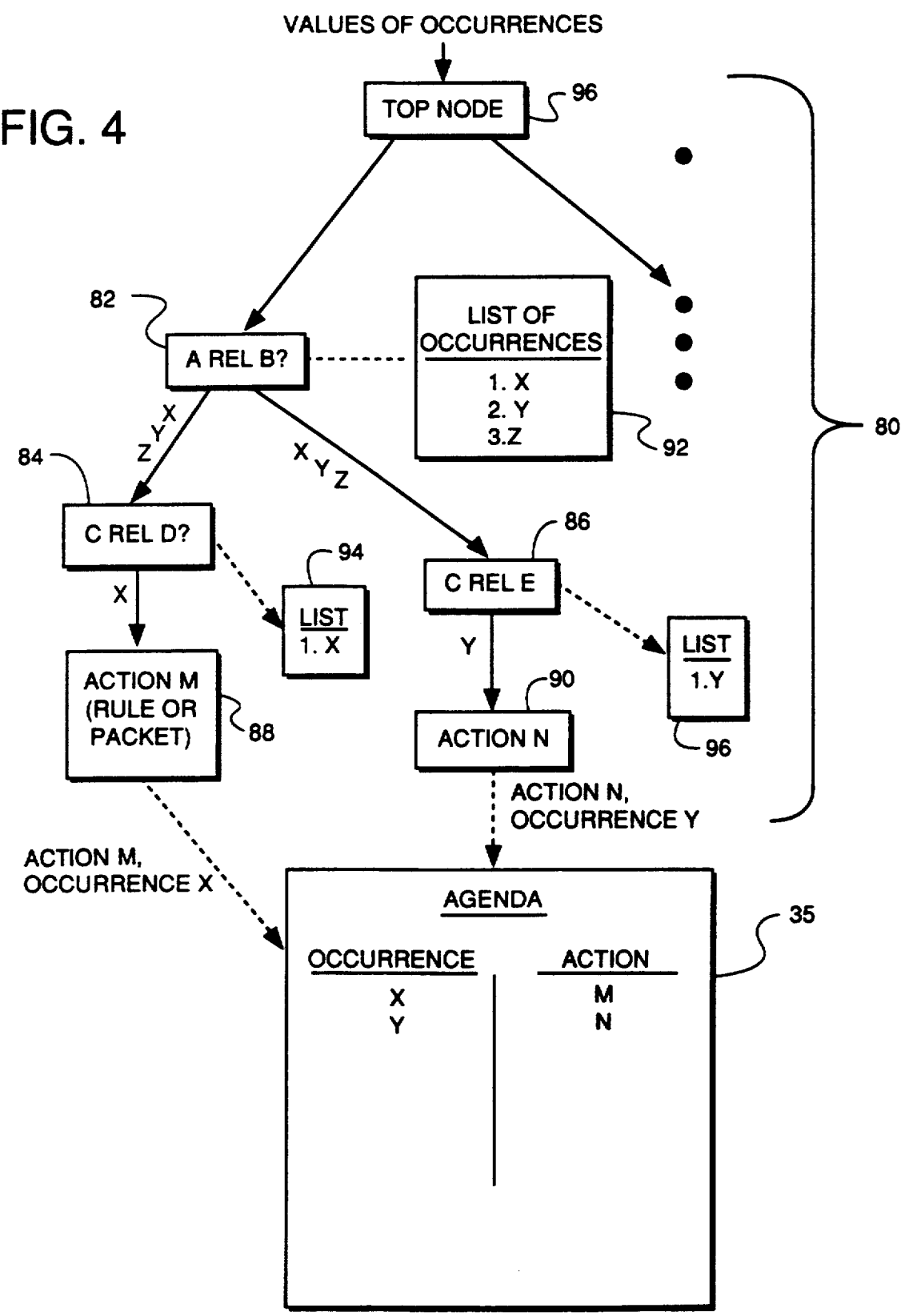
FIG. 4 is a representative portion of an example of a Rete network.

Referring to FIG. 4, for example, in a Ret network 80, each primitive test node 82, 84, and 86, represents all of the appearances of a particular primitive test such as A relationship B (e.g., "name='chips'") in any of the rules of the knowledge base. Nodes 88 and 90 represent actions (specified in rules) to be performed when an appropriate set of test have been satisfied. For example, action M would be triggered when A rel B and C rel D are true, while action N would be triggered when A rel B and C rel E are true. Because the Rete network identifies primitive tests that are shared in common by different rules, each primitive need be tested only once and the result is then available with respect to all of the rules where that primitive test appears.

Associated with each primitive test node is a stored list of occurrences 92, 94, 96. During operation each list stores occurrences which satisfy the test based on existing values for attributes involved in the test. For example, occurrences X, Y, and Z in the object in which B is an attribute may satisfy the primitive test of node 82 and they therefore appear on list 92. Those three occurrences are in effect passed down to the next primitive test node 84 to see if its test is also satisfied for any of the occurrences X, Y, and Z. In FIG. 4, it is assumed that occurrence X also satisfies C rel D; Y therefore appears on list 94. X is then passed down to the action node 88. The occurrence X has then been bound to the action M and that information is placed on agenda 35 indicating that action M is ready for execution.

When an application has been developed, to the extent that values of attributes have been assigned they are passed through the Rete network via a top node 96 and the occurrences for any primitive tests that are satisfied are added to the corresponding occurrence lists. During operation of the application, as values are added, deleted, or changed, the modifications are processed through the Rete network. At any stage of operation, when all values have been processed through the Rete network, any action items listed on the agenda are executed in an order determined by the inferencing engine. Execution of action items will typically trigger other changes in values which must be processed through the Rete network and the process repeats.

Processing of a primitive test represented by one of the nodes of the Rete network will typically require fetching occurrences from specified objects and testing the values of the occurrences. For objects stored in KDB, which are typically specified as being active, this generally presents no problem, because occurrences in those objects are continually monitored for changes and are automatically flushed through the Ret network as changes occur.

Objects stored in external data bases, on the other hand, may have so many occurrences that they would swamp the Rete network if they were constantly and indiscriminately flushed through the Rete network. To avoid that situation, objects stored in external data bases are designated as inactive and occurrences in those data bases are only retrieved selectively when needed. (KDB objects may also be designated inactive if desired).

The rule network is constructed from the developer's rule and packet test (e.g., FIG. 2) by four components: the parser, navigator, network compiler, and dataflow builder (see FIG. 3).

The responsibility of the parser is to take test representing rules, tests, and actions and emit an interpretation of the rules specifying (1) what tests are to be performed on what attributes of which objects, and (2) what actions are to be performed on which attributes and objects and in what order. The form of the parser's interpretation is a single interpret node supplemented by auxiliary semantic node/word node trees. The order of the tests, any implied relationships between objects being tested, and what mechanism is to perform the tests, is not decided by the parser.

The responsibility of the navigator is to take the single interpret node emitted by the parser and emit a tree of interpret nodes designating an order of the subtests in a rule based on the relative expense (processing cost) of performing the subtests. In addition, any implicit relationships between tested objects is made explicit by the navigator by inserting in the relationship slot of the interpret node one of a set of predefined (by the programmer) semantic criteria relationships. The relative expense of a subtest component of a rule test is calculated using the number of occurrences in the referenced objects, the locations where each object is stored, and the boolean and relational operators involved in the subtest. A final responsibility of the navigator is to cluster subtests into subtrees containing references to objects which all are stored in one location, and to break that subtree out of the original test tree and attach it to a new interpret node specific to that location.

The responsibility of the network compiler is to take a sequence of interpret trees emitted by the navigator and create a network of test nodes that use single shared tests to represent redundant tests encountered in the sequence of interpret trees. In addition, the compiler detects interpret trees or subtrees that refer to inactive objects and passes them to the dataflow builder. In this way, the compiler partially determines what mechanism is to perform the various subtests by partitioning the tests into those to be performed locally by the inference engine and those yet to be determined by the dataflow builder.

The responsibility of the dataflow builder is to take the interpret subtree passed to it by the compiler and generate a dataflow program to it by the supplements the interpret subtree (which specifies location and relative retrieval expenses) with functional specifications that enable retrieval of the occurrences specified by the tests. In addition, the dataflow builder decides and designates what mechanism (either the dataflow evaluator or a specific database) is to perform the tests specified in the incoming interpret tree.

In setting up the Rete network, the parser, navigator, network compiler and data flow builder use three types of nodes: interpret nodes, semantic nodes, and word nodes. Each node includes a set of slots.

Figure 5:
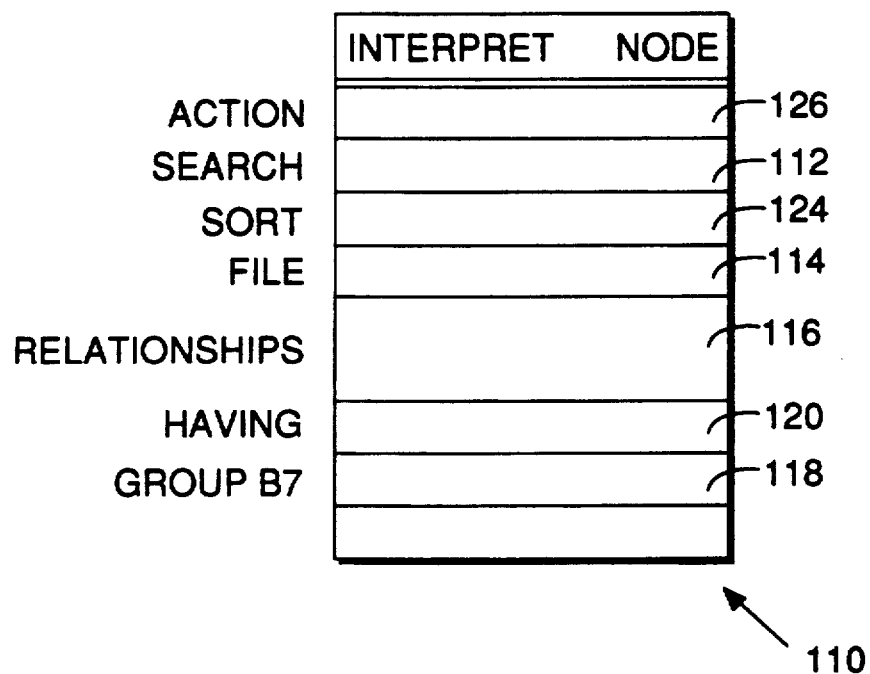
FIG. 5 is a diagram of an interpret node.

Referring to FIG. 5, a typical interpret node 110 is generated by the parser and corresponds to a rule or query. A search slot 112 identifies the search criterion, for example, SIZE=LARGE AND CONTAINER NOT BOTTLE. A file slot 114 lists the objects which are the subject of the search. A relationships slot 116 holds a set of search criteria based on a relationship between two objects, for example, INVENTORY NAME=ITEM INAME (i.e., the attribute name in the object invention is tested against the attribute iname in the object item). The group by slot 118 indicates a set of summary functions applied to attributes of occurrences grouped on the values of particular attributes, for example, AVERAGE VOLUME, GROUP BY SIZE. The having slot 120 defines a search restriction to be applied to summary occurrences grouped in accordance with the grouped by slot entry. A sort slot 124 specifies the ordering in which occurrences are to be handled, for example, SORT BY QUANTITY AND PRICE. Finally, the action slot 126 specifies actions to be taken if the search criteria (tests) are met.

Figure 6:
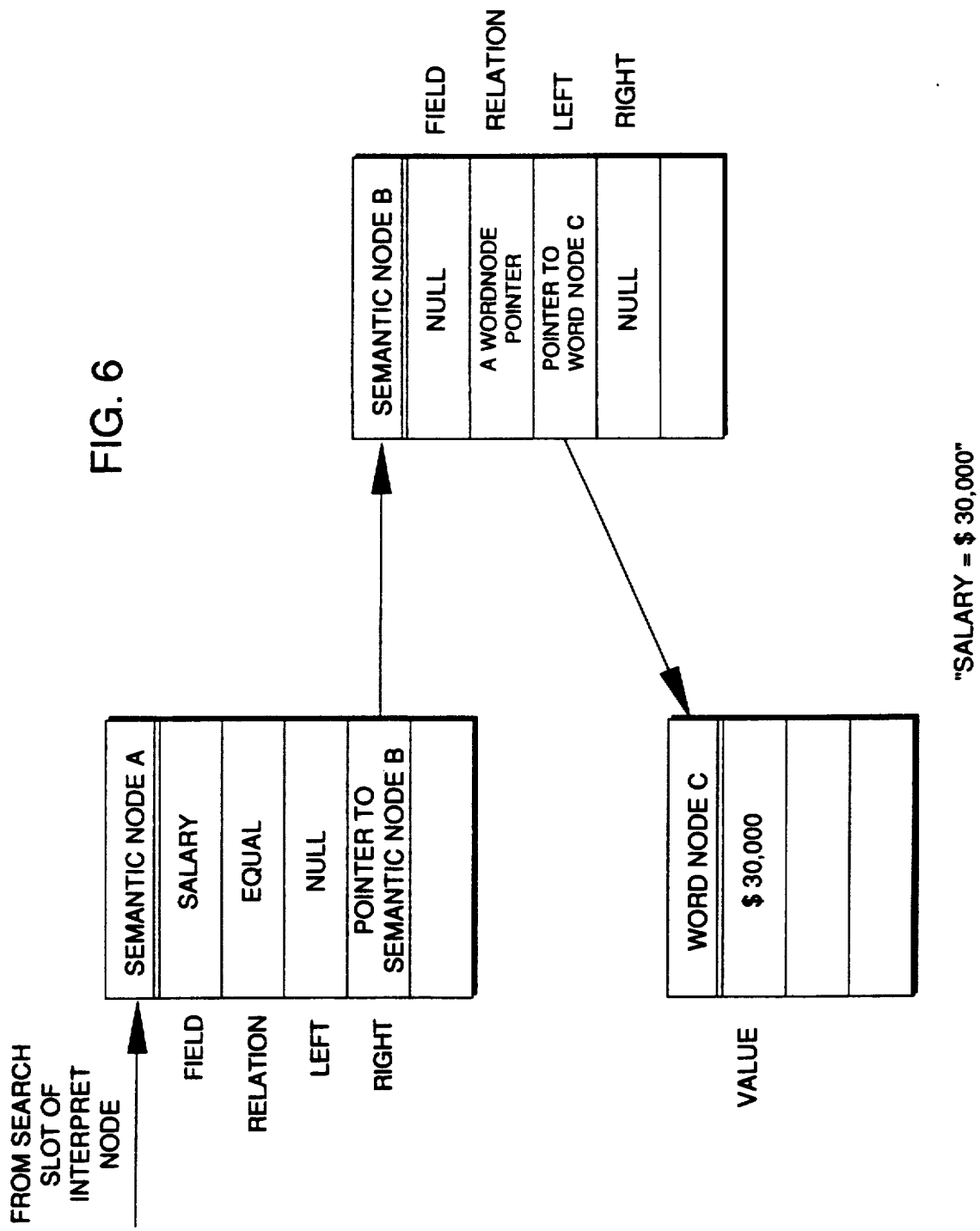
FIGS. 6 through 10 are examples of node trees.

The parser uses the information in the rule test to generate a tree of semantic nodes that break down the requirements of the interpret node into more primitive elements. Referring to FIG. 6, for example, if a rule contained a search criterion for occurrences in an object EMPLOYEE in which SALARY=$30,000, the parser would set up the semantic structure shown.

Semantic nodes have four slots: a field slot that holds a pointer to an attribute or an object (the attribute SALARY in our example); a relation slot which defines the relationship being tested (in the example, EQUAL); and left and right slots containing respectively two possible pointers, one to a node to the left of the present node, the other to a node to the right of the present node. In the example, the semantic node A has a null left slot and its right slot points to a semantic node B which in turn points to a word node C in which a fixed value $30,000 has been stored in a value slot.

Figure 7:
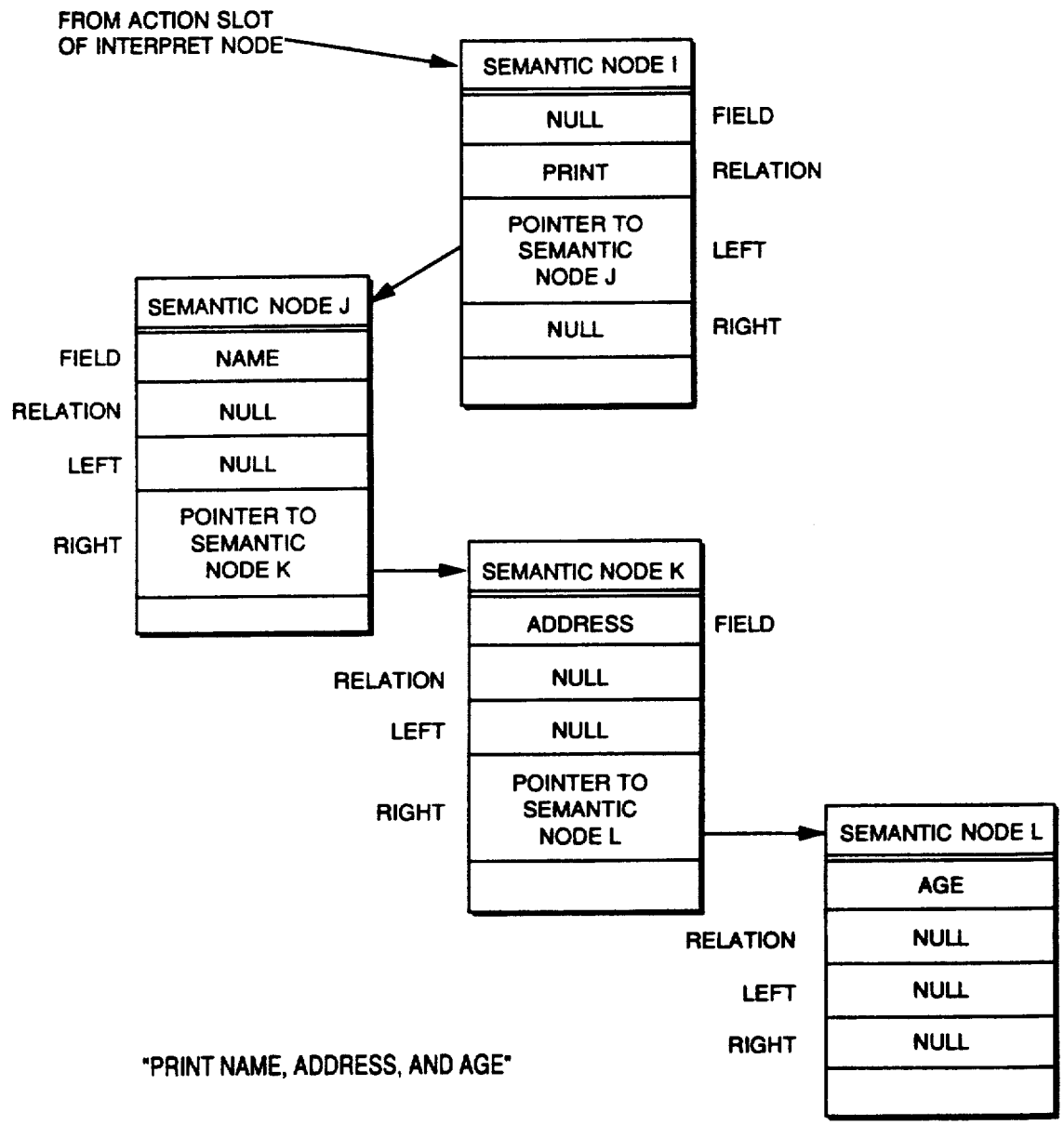

Referring to FIG. 7, for a print command located in the action slot of an interpret node, the parser would build a set of four semantic nodes I, J, K, and L. Node I identifies, in its relation slot, the print action to be performed on the list of attributes identified through the left pointer as semantic nodes J, K, and L. Each node J, K, L identifies, in its field slot, one of the attributes to be printed, and the first two nodes point (in their right slots) to the next semantic node in the sequence.

Figure 8:
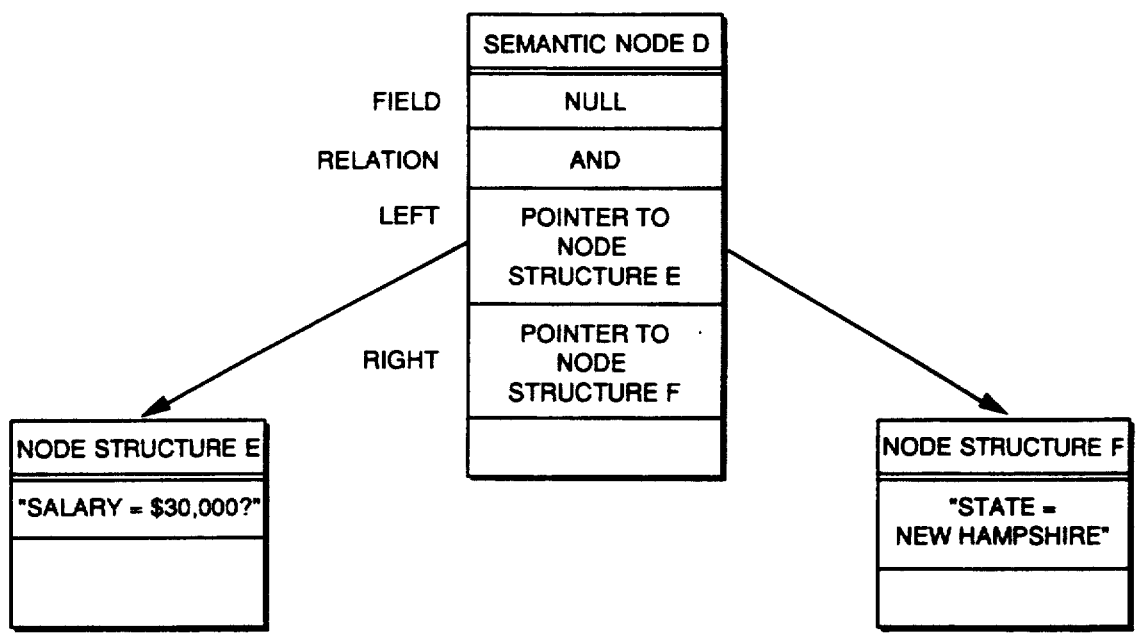

Referring to FIG. 8, a more complicated search could be broken down between one node structure E (like the structure of FIG. 6) and a second similar node structure F (for the test STATE=NEW HAMPSHIRE). The two node structures E and F are then tied respectively to the left and right pointers of a parent semantic node D whose field is null and whose relationship is "=".

Figure 9:
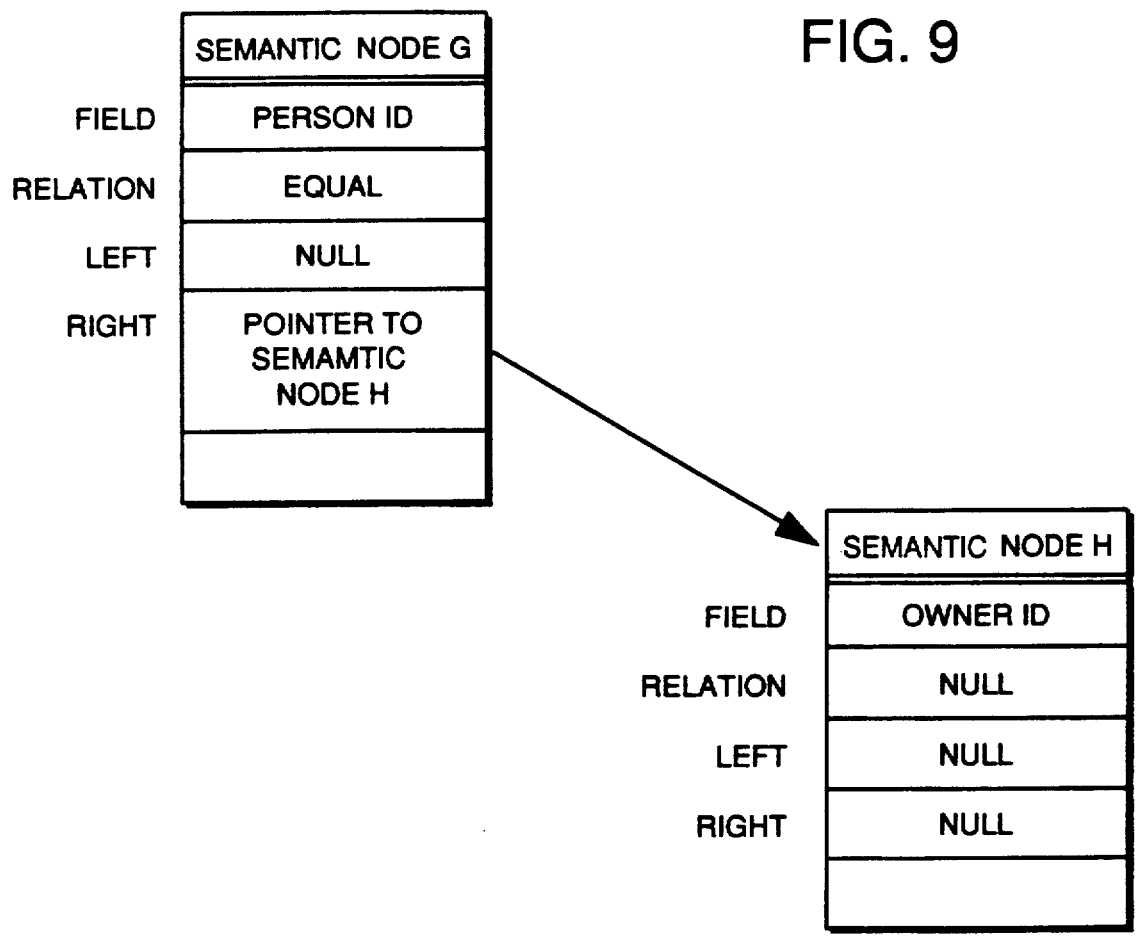

Referring to FIG. 9, a similar breakdown could be used for a query for all people who own red cars where the 'person ID' attribute in the person object and the 'owner ID' in the car object correspond.

Figure 10:
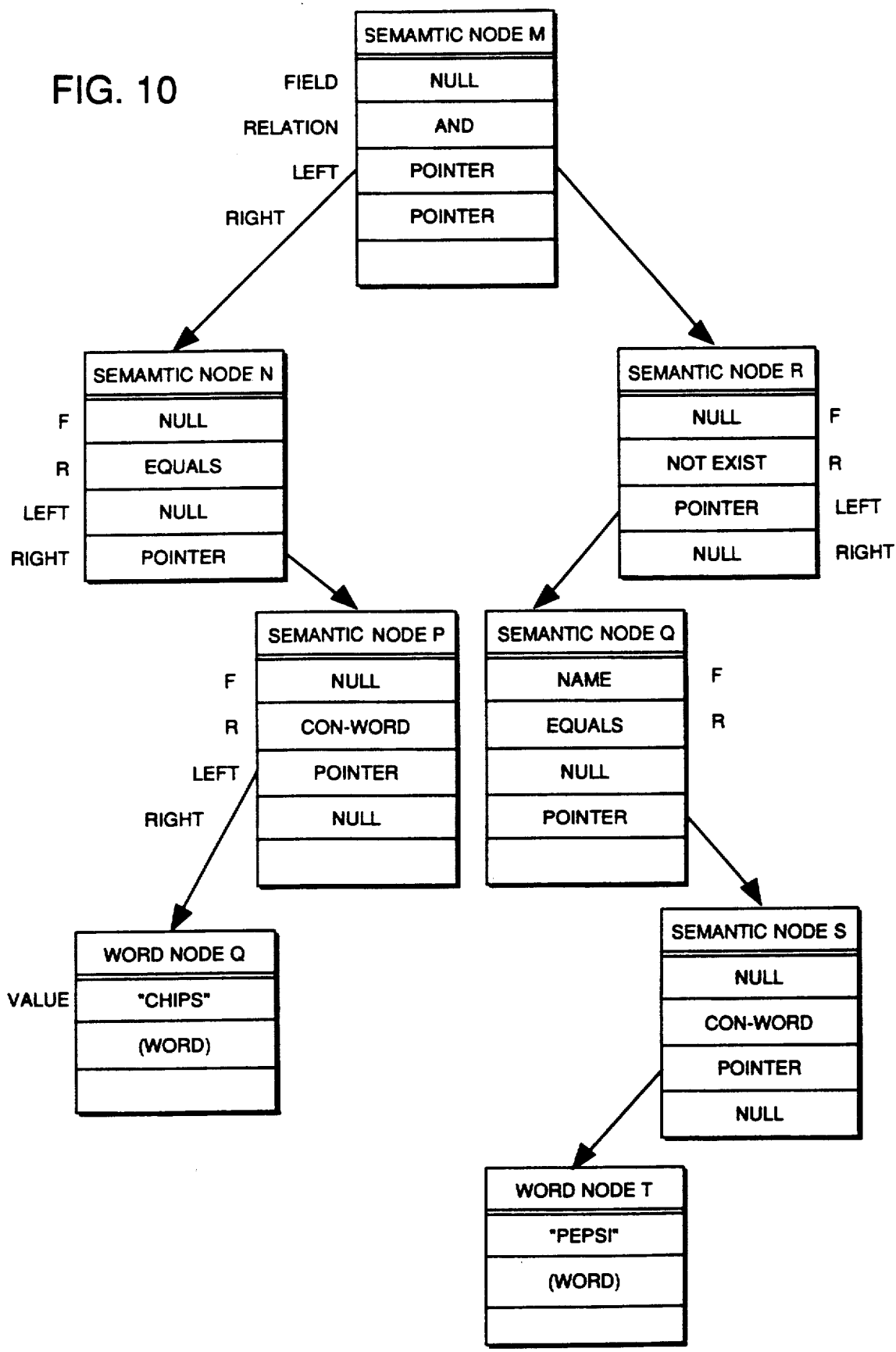

As another example, FIG. 10 shows the node structure for the tests represented by rule B1 on FIG. 2B.

Figure 11:
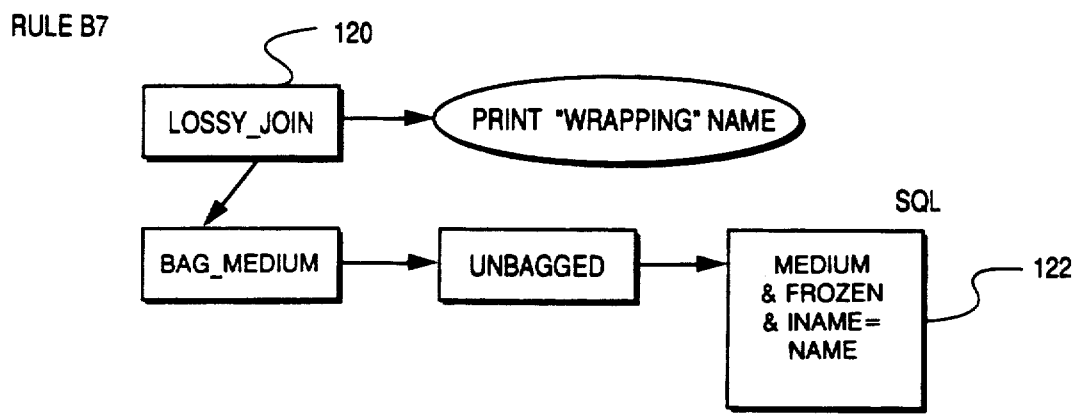
FIGS. 11, 12, 13 are diagrams of node structures for three rules of FIG. 2.
Figure 12:
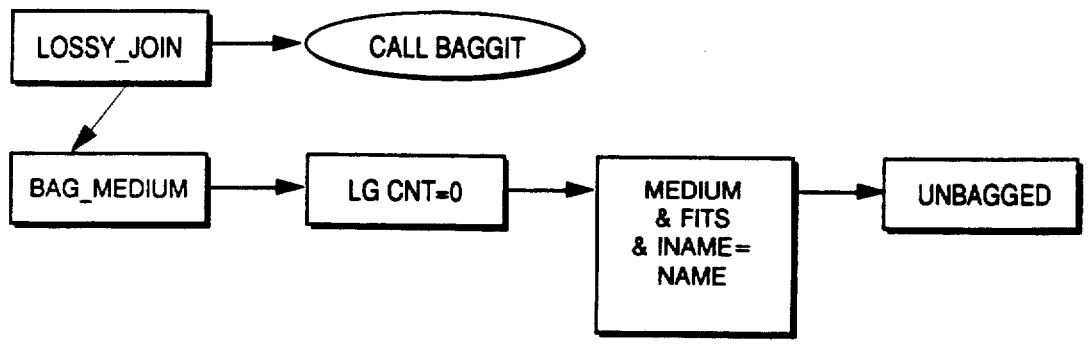
Figure 13:
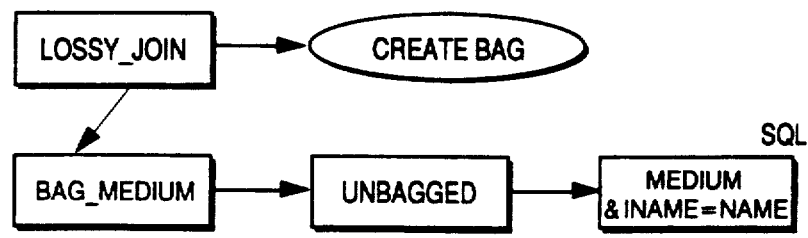
Figure 14:
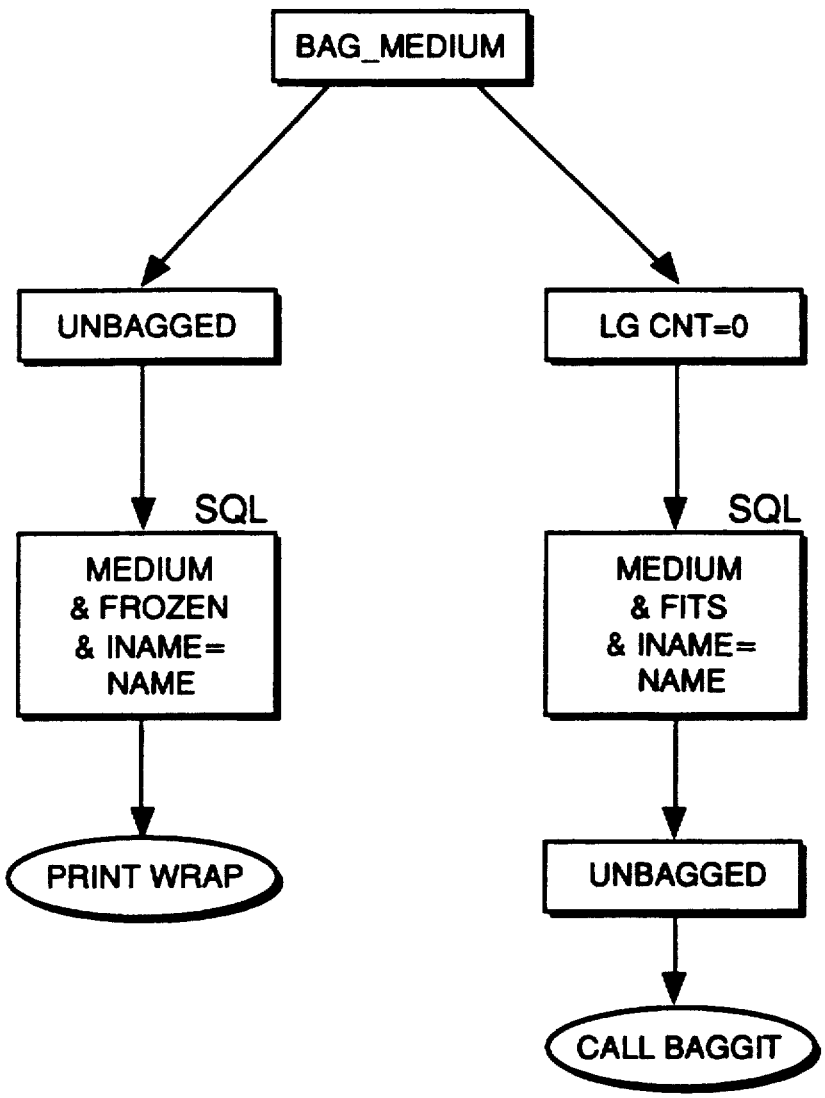
FIGS. 14, 15, 16 are diagrams of three stages in the development of a portion of a Rete network.
Figure 15:
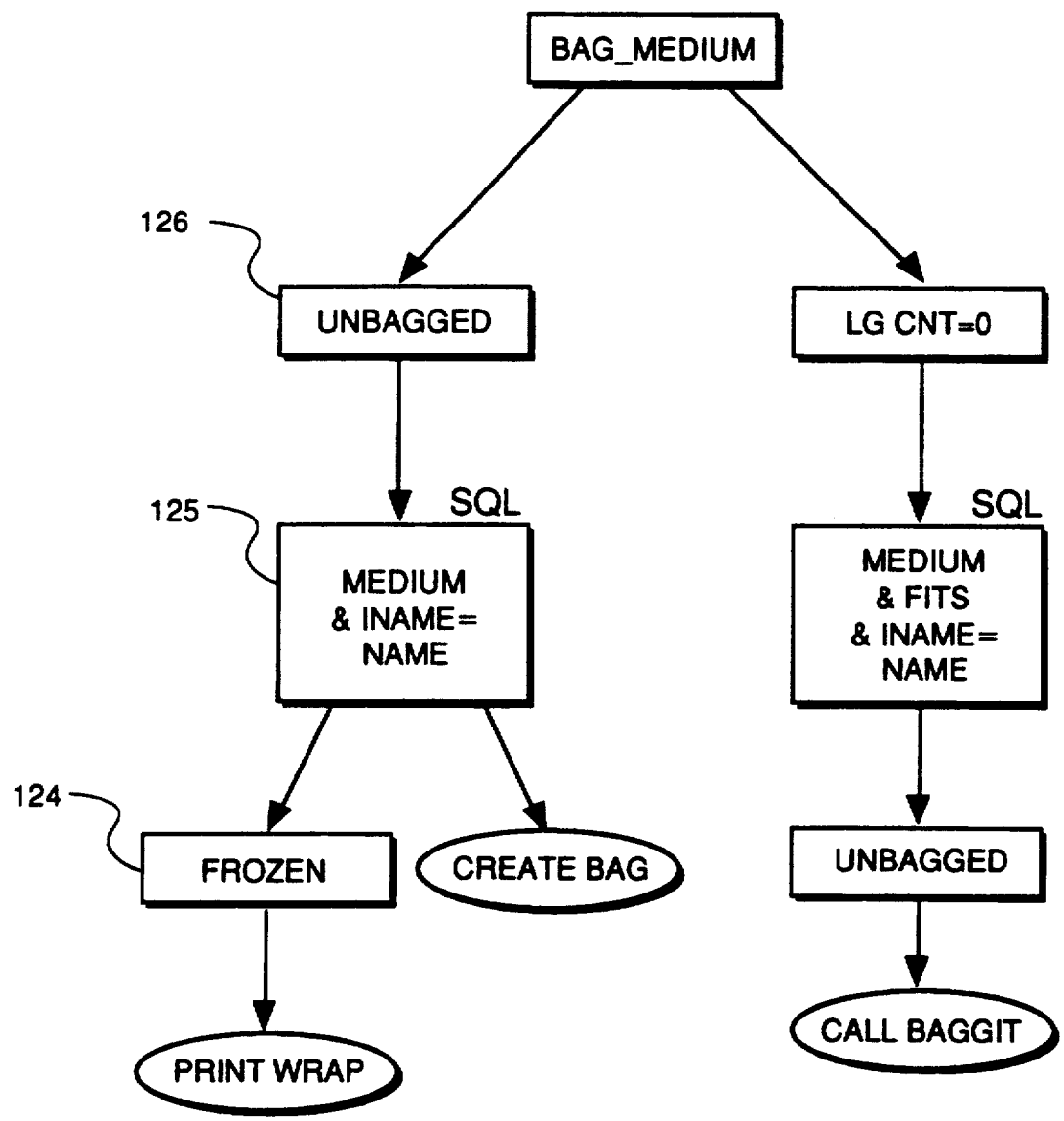
Figure 16:
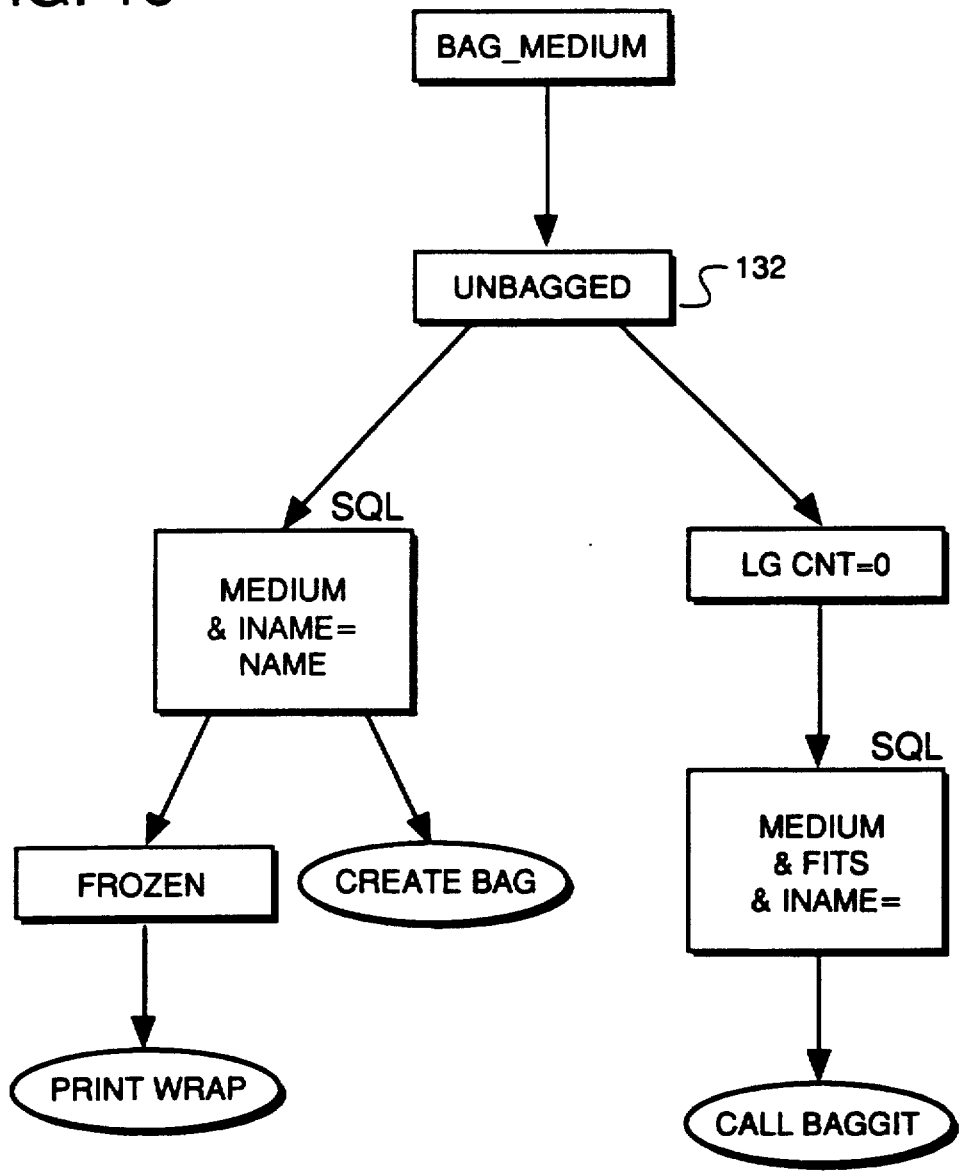

FIGS. 11 through 13 illustrate the steps taken by the navigator, and FIGS. 14 through 16 the steps taken by the network compiler in generating a portion of a Rete network corresponding to rules B7, B8, and B9 of FIG. 2C. (In these FIGS., primitive test nodes—and groups of them—are shown as boxes, and action nodes as ovals).

Referring to FIGS. 11 through 13, first the navigator sets up three independent node structures representing respectively the three rules B7, B8, and B9. In doing so it begins with a lossy_join node 120 which indicates that the primitive tests which follow are meant to be combined so as to screen out any occurrences which do not satisfy all of the tests. Assuming such an occurrence is found, the resulting action is shown in the oval to the right of lossy_join box, e.g., print 'wrapping' name in the case of FIG. 11. Thus FIG. 11 means "If a presently unbagged item is medium sized and frozen, then print a message indicating that it is being wrapped."

Note that FIG. 11 includes primitive tests drawn from the rule_prefix entry in the packet definition, and that all references to objects which are located in the external data base have been grouped into a single box 122. (As seen in FIG. 2A, frozen, iname, and medium all relate to attributes of an SQL object inventory.) Clustering references to external data bases in this way is important because it will allow fewer, more efficient calls to be made to the data base.

Next the network compiler, in several steps, analyzes the sequence of nodes assembled by the navigator. In FIG. 14, the network compiler has assembled in parallel the two sets of nodes corresponding to rules B7 (on the left) and rule B8 (on the right) both emanating from the bag_medium node. In FIG. 15, the network compiler has added in the nodes of rule B9. By separating out a node 124 for the test 'frozen' the navigator has been able to use the 'unbagged' and 'medium & iname=name' nodes 126, 128 for both rules B8 and B9. Implicitly, the network compiler has made a choice that the inefficiency in a successive test node following the SQL call is smaller than would result in having two nodes requiring two SQL calls in parallel, which would occur if the primitives of node 126 had not been factored as shown.

Referring to FIG. 16, the network compiler next recognizes that the unbagged node 130 (FIG. 15) may be combined into a node 132 which not only reduces the number of primitive tests that must be made, but also puts the SQL calling node 134 as low as possible in its chain.

To summarize, the resulting section of the Rete network has the advantages that (a) the number of calls to SQL objects have been reduced by segregating and grouping together test primitives that involve SQL objects, and (b) calls to SQL objects are generally deferred to the lowest points in the network, following nodes which refer to objects that already reside in the KDB.

One exception to the latter principle of deferring all data base calls as long as possible would be a call for a specific occurrence of an object identified by a key attribute. In that situation it may be desirable to advance the call ahead of others (and to fetch all attributes of the specified occurrence) because various attributes of that occurrence may be needed by different branches of the network and one call made early can obviate the need for multiple later calls.

Once the Rete network has been formed, the data flow builder creates groups of additional nodes to execute the external data base calls provided in nodes of the Rete network.

The data flow builder is familiar with the functional capabilities of each external data base accessible to the KBMS. Some external data bases (e.g., SQL) will be capable of implementing relatively high-level search strategies, permitting relatively high-level test primitives to be passed directly to the data base. Other external data bases provide only minimal functionality, requiring KBMS to perform many steps which in effect manage the data base search. In order to enable KBMS to perform such steps, the data flow builder is able to create a number of different types of primitive function nodes. (As discussed below, it is the data flow evaluator which actually executes these nodes).

Occurrences sent back from an object in a data base may be thought of as appearing in a stream. The primitive functions available from the data flow builder perform various operations on such streams, including the following.

A generate function provides a conduit through which a stream of occurrences fetched from the data base are initially passed. A restrict function acts as a filter to screen out any occurrences that fail the test associated with the restrict function. An intersect function receives two streams of occurrences and passes the intersection of the two, e.g., those occurrences which have identical attribute values in both streams. A union function receives two streams of occurrences and passes both of them.

In addition, a lossy_join function receives two streams of occurrences from two objects with N+M occurrences respectively and passes of the N×M occurrences combinations those which pass the join test associated with the losssy_join function. For example, a search for "cars and their owners" in two objects (where one object lists people and their social security number, and another object lists social security numbers and their cars) would produce a stream containing a list of people and the car owned by each of them. A lossless_join function representing a search for "everyone and his car" is similar to a lossy_join except that occurrences of individuals who do not own cars would be included. A failed_join function for the search "everyone who has no car" would produce all of the occurrences that were included in the stream produced by the lossless_join example above but which were not included in the lossy_join examples above.

A 'unique' function, with respect to an attribute A, receives a stream and passes only occurrences for which the value of A has not yet been in an occurrence. This could be used to effectuate a search for 'all counties in which customers of the company have warehouses' in an object which lists warehouses and their addresses, where multiple warehouses are located in particular counties.

An exists function generates a yes or no output based on whether an occurrence meets the associated criterion. A not exists function would produce an output opposite to the output of the exists function.

A sort function receives a stream and produces an output stream of occurrences sorted by specified attributes.

A grouping function implements a specified action on the occurrences of a stream on a group by group basis. The group by function could implement, for example, a request for the average salary of employees grouped by state.

An RHS (right-hand side) function applies an action list to each occurrence in an input stream.

Figure 17:
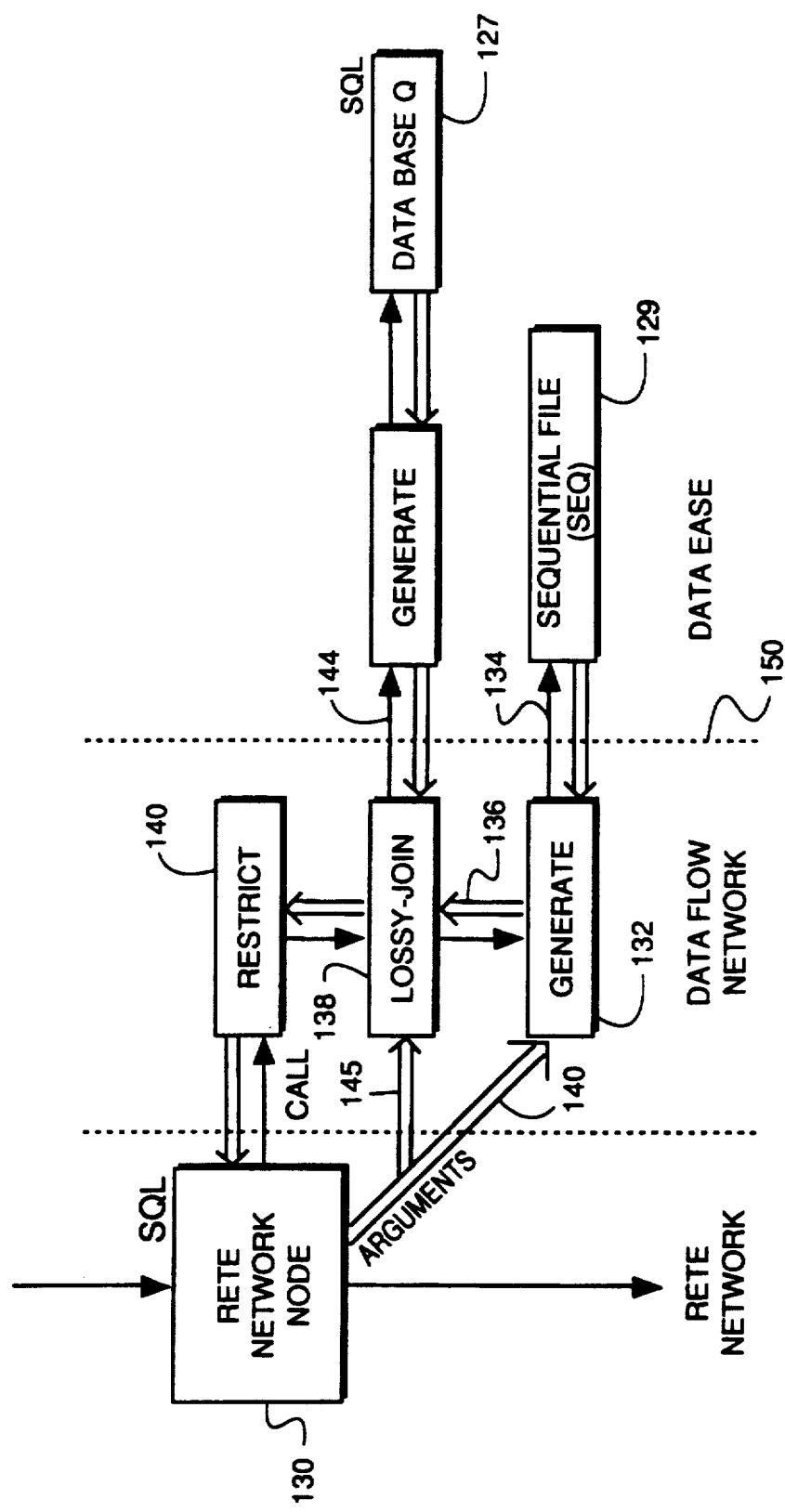
FIG. 17 is a diagram of a portion of a data flow network and its relationship to a Rete network and data bases.

Referring to FIG. 17, as an example of how the data flow builder makes use of the available functions, consider a Rete network node 130 which specifies, as a test, to do a lossy_join of object X, stored in an SQL database Q 127, with object Y stored in a sequential file (SEQ) 129 such that attribute C has the same value in the occurrences of both objects; and then restrict the occurrences according to the criterion that attribute A of object X is smaller than attribute B of object Y.

The data flow builder, recognizing that SEQ provides very little functionality, first sets up a generate node 132. Its roles are to trigger the detailed call needed to retrieve successive occurrences of attributes B and C of object Y from SEQ, over line 134; to receive the value back over line 136; and to pass it on line 136 to the next higher node 138. The generate node receives the arguments (object Y, attributes C) from node 130 via line 140. Recognizing that the SQL data base is able to perform its own retrievals based on fairly high-level queries, the data flow builder places a lossy_join node 138 as shown. Its purposes are (a) to provide a fairly high-level request on line 144 to SQL data base Q 127 to fetch an occurrence of attributes A and C in object X, (b) to receive back the fetched occurrence, (c) to combine it with the corresponding occurrences of attribute C in object Y, in accordance with the lossy_join function, and (d) to pass the resulting stream to the next higher node 140. Lossy_join node 138 receives the arguments (object X, attributes A, C) from node 130 over line 146.

The restrict node 140, screens the combine stream received from node 138 to exclude any occurrences for which the value of attribute A is not smaller than the value of attribute B.

It should now be apparent that the data flow builder, in a manner entirely transparent to the user or developer, structures the external data base calls in a manner which delegates to data bases functions which they are able to perform, while having the data flow evaluator perform data base type functions which a given data base is not able to perform. The developer or user need only refer to the stored objects by name and may structure rules and queries in a uniform manner without regard to where the objects are stored.

The functions of the data flow evaluator are (a) to execute the steps of the data flow network, (b) to convert retrieved occurrences to a form usable by KBMS, (c) to determine when an occurrence retrieved from a data base should be transduced (stored) in the knowledge data base of KBMS, (d) to perform the transduction, (e) to perform transduction filtering, (f) to perform cursor control with respect to the external data bases, (g) to optimize the retrieval of key specified occurrences, (h) to manage the storage of occurrences back in the data base, (i) to synchronize uses that KBMS makes of external data base occurrences with the state of those occurrences in the external data base, and (j) to execute any other steps required by the data flow network.

These functions of the data flow evaluator are carried out in a manner which further helps to minimize the overhead spent on and improve the efficiency of external data base retrievals.

Figure 18:
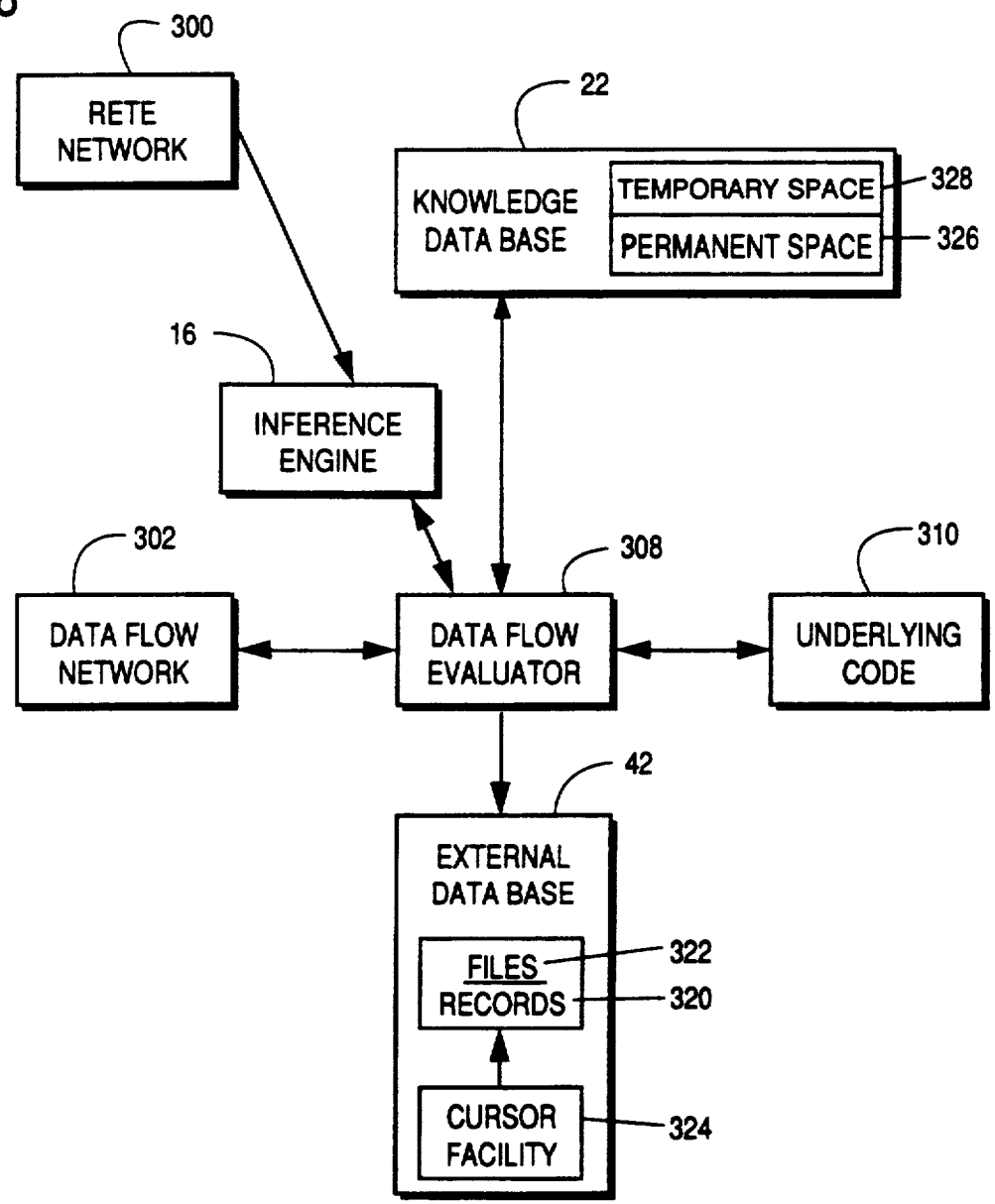
FIG. 18 is a block diagram of a data flow evaluator and related elements of the knowledge base management system.

Referring to FIG. 18, in a typical external data base 42, occurrences are stored as records 320 in names files 322. A cursor facility 324 is normally provided to point to a record of current interest within a file. The inference engine 16 in KBMS is arranged to deal with occurrences in objects only after they have been stored in the local, flexible, high-speed storage provided by the knowledge data base 22.

In particular, KDB 22 includes a permanent memory space 326 where values entered by the developer are stored and a temporary memory space 328 for storing values which are of temporary interest during a user session, i.e., values entered by the user and values retrieved from the data base.

The process of copying an occurrence retrieved from a data base into the KDB temporary memory space 328 is called transduction.

One general principle of operation of the data flow evaluator is to perform transduction at the latest possible stage in the data base retrieval process in order to minimize the volume of information stored in the temporary memory space. Thus, referring again to FIG. 17, the data flow evaluator would first execute the generate node, lossy_join node, and restrict node, before transducing the occurrences delivered from the restrict node into temporary memory space. Because the restrict and lossy_join nodes act as filters (to data flow and data base streams respectively) which reduce the remaining number of occurrences, the number of occurrences that become stored in the temporary memory space is minimized.

An exception to this principle of delayed transduction concerns retrievals of key specified occurrences. When the data flow evaluator encounters a request for such a retrieval, it retrieves all attributes of the named occurrence at once and immediately transduces them into temporary memory space. By nature, key occurrences tend to be referred to several times in succession. By immediately transducing the entire occurrence, because there is only one occurrence matching a key search specification, later references to that occurrence can be served immediately, without returning to the external data base, simply by having the data flow evaluator check the temporary memory space to see if the key occurrence is already there.

Cursor control by the data flow evaluator provides efficient use of occurrences stored in an external data base in executing Rete network nodes of the kind, for example, that require scanning through a range of occurrences in an object to find the ones that satisfy a specified test. In executing such a node, the inferencing engine typically will ask the data flow handles for one occurrence that satisfies the test. The data flow handler will find one (using the transduction filtering described above), transduce it into the temporary memory space, and so inform the inference engine. The inference engine will then ask for another occurrence and the process repeats until all occurrences meeting the test have been transduced. For the data base handler to serve such inferencing engine requests effectively, it needs to be able to set and reset the cursor in the data base to successive occurrences. The cursor in effect enables the data base handler to keep track of where it is within an object.

Cursor control is handled as follows. During the original data flow network compilation process, whenever a node is compiled which involves a request to an external data base, the data flow handler generates a sequence of data base call instruction designed to initialize the cursor at the beginning of the relevant object and to provide the data base handler with the cursor value (place marker).

At run time, when the node is encountered, the cursor value is initialized. Thereafter, each time the next occurrence in a data base record is fetched, the cursor value is incremented by the data base evaluator and is used to point to the next needed occurrence in the object. After fetching the final occurrence in the object, the data flow evaluator terminates the cursor by sending appropriate commands to the external data base's manager.

In addition, the network compiler insists that each data base request transduce the entire list of attributes needed by all network requests for that data base object. That is, each request when transducing an instance will transduce enough information (attributes) to service any other request in the network.

When a value is assigned to an attribute of a data base object, the value of the attribute in the data base is not immediately changed, but rather the replica stored in KDB is changed. Since it is common to assign values to more than one attribute of a data base object in a rule, each assignment is made to the replica without changing the data base occurrence, in an attempt to accumulate enough work to make the conversation with the data base during data base update worthwhile. All assignments to the data base attributes in the right hand side of a rule are performed without data base update. At the end of the rule action sequence, the data base replica needs to be synchronized with the data base occurrence.

It is possible (and for some purposes useful) to update the replica of a data base occurrence without updating the data base occurrence itself. The modified replica will propagate through the network with the new value causing whatever ensuing activity that the rules require. Used in this way, the replica can be thought of as a set of local variables available for calculation. The other alternative is to update the data base occurrence with the modified values of the replica. This is accomplished with a SYNC action. The SYNC action takes a list (possibly empty) of object names as arguments and flushes any modified values of the replica bound at the time of the SYNC action to the corresponding occurrences in the data base. If the list of object names is empty, then all data base objects assigned to in the right hand side action sequence are flushed to the data base. For each object name, a SYNC action flushes values for one replica. A SYNC action thus must be applied to each replica to be flushed to the data base. At compile time, a set of data base update requests is prepared for each SYNC action. During SYNC invocation, the unique key of the replica is used to obtain the corresponding data base occurrence, and the modified replica attributes are updated in the data base. So that the rule writer need not append SYNC actions to all assignments of values to data base attributes, a switch is available that ensures automatic data base synchronization at the end of every rule that updates a data base object.

Most data bases require a designation of the end of a unit of work. This can be handled implicitly or explicitly in KBMS. Implicitly KBMS automatically commits any data base work performed during a session upon exit from the session. Explicit COMMIT and ROLLBACK actions may also be used to, respectively, COMMIT all data bases or ROLLBACK all data bases.

In cases when the Rete network node specifies an action that requires returning an occurrence to an external data base, there is an issue as to when and how the delivery of the occurrence should be made. Typically external data bases have facilities which enable a lock to be requested at the same time that an occurrence is being fetched. The data base manager applies the lock to that occurrence to prevent action on any other request for that occurrence. Later when the original requester returns the (possibly revised) occurrence to the data base, the lock is released.

In the present invention, the data flow evaluator does not request a lock. Instead, when an occurrence is to be returned to a data base, the data flow evaluator first fetches the occurrence again from the data base and compares its value with the values of the occurrence as originally fetched. If discrepancies are found, these are identified and reported to the user. Otherwise, any required modifications stored locally in the temporary memory space are made to the occurrence, and it is written back to the data base.

Figure 19:
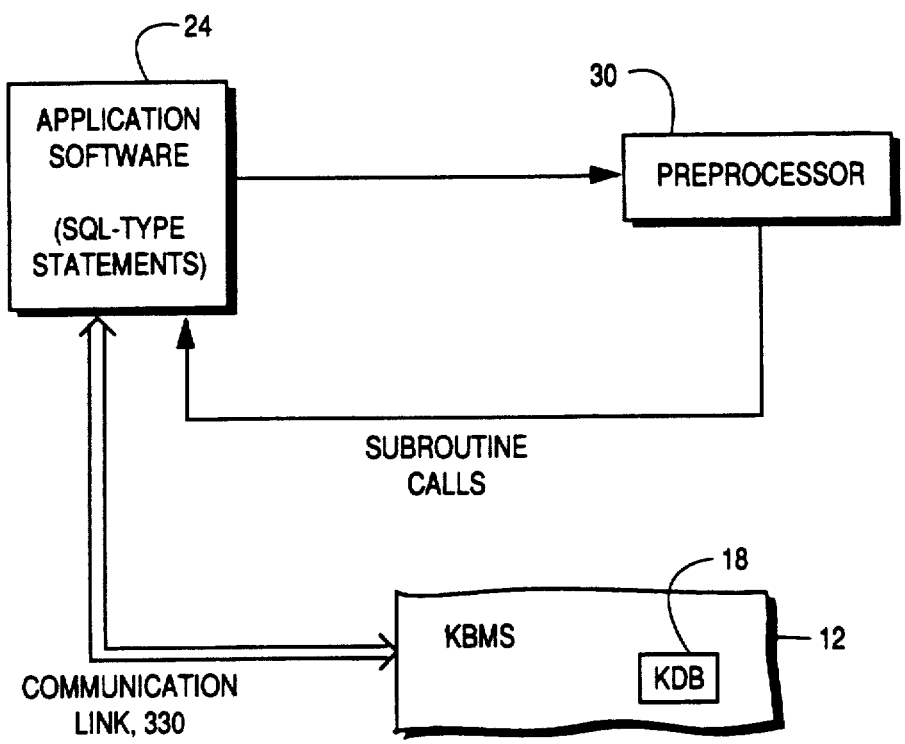
FIG. 19 is a block diagram of the relationship between application software and the knowledge base management system.

Referring to FIG. 19, the facility which enables KBMS to accept and act on attribute values and queries received from a COBOL program, includes a preprocessor which reviews the COBOL program and when it finds SQL-type statements, substitutes subroutine-type calls which provide a mechanism by which the attribute values and queries and response may be passed via a communication link 330 between KBMS 12 and the application software 24. The attribute values and queries form the COBOL program do not merely trigger a retrieval of requested occurrences from an SQL data base; that is, the KBMS does not merely pass the attribute values and queries through to an SQL data base. Instead, the SQL-type statements serve as a mechanism for invoking the full operation of the inferencing engine using objects stored either in KDB or an external data base. Note that there need not be an external data base at all, and in that case the COBOL programmer need not be aware that he is not actually using an SQL data base.

In general, an SQL-type query to a data base may include assertions of attribute values (e.g., by an INSERT statement) which KBMS applies to the top of the Rete network, just as any other attribute value occurring during a run is entered into the Rete network. Those assertions may trigger calls to an external data base and, ultimately, may result in an action being placed on the agenda. The action may involve sending back a response to the COBOL program. The KBMS may also request additional information from the COBOL program. Thus, as an example, a COBOL program designed to generate an order for parts could send to KBMS a skeletal order listing a customer's name and three part numbers and KBMS could expand the skeletal order into a complete order and return it to the COBOL program.

Other SQL-type statements that are serviced by KBMS include UPDATE and DELETE. The normal function of UPDATE is to update a data base field or column with a value; KBMS executes the statement by passing the attribute and value to the inference engine for assertion in a set of inference rules in the knowledge base system. DELETE is executed by passing the occurrence to the inference engine for assertion of the deletion in the inference rules of the knowledge base system.

An example of a COBOL program with embedded SQL statements is set forth in Appendix A and the same program, with the subroutine calls inserted by the preprocessor, is set forth in Appendix B. In Appendix A, each SQL command is preceded by EXEC AISQL and followed by END-EXEC. In Appendix B, AISQL-DA-STRUCT1 is the COBOL data storage area used for all information passing from COBOL to KBMS; AISQL-DA-STRUC2 is used in the other direction.

SQL statements in a COBOL program can be phrased in a form such that attribute values are specified and a query is phrased all in the same statement, for example, "SELECT WINE FROM RECOMMENDATION WHERE ENTREE='VEAL' of SAUCE='TOMATO-BASED'". The statement both asserts values (veal and tomato-based) and requests a response (a wine recommendation).

Figure 20:
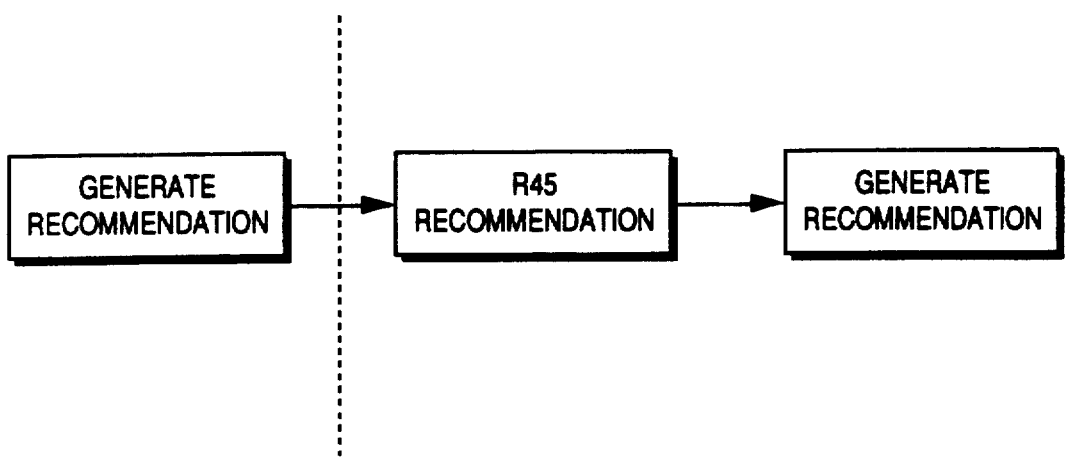
FIG. 20 is a block diagram of a portion of a data flow network relevant to a COBOL request.

Referring to FIG. 20, from the point of view of the data flow structure, this type of statement would translate into three nodes specifying two separate dataflow programs. The right most program consisting of the RHS node and the generate node are invoked first, assigning to the ENTREE and SAUCE attributes of a MEAL object. These assignments provide sufficient facts to allow the rules to determine and assign a WINE attribute of a RECOMMENDATION object. The second dataflow program consisting of the left most node is then invoked to retrieve the RECOMMENDATION and return it to the application COBOL program.

Other embodiments are within the following claims.

APPENDIX A

```
       IDENTIFICATION DIVISION.
       PROGRAM-ID.  SUNDAY.
       ENVIRONMENT DIVISION.
       CONFIGURATION SECTION.
       INPUT-OUTPUT SECTION.
       DATA DIVISION.
       FILE SECTION.
       WORKING-STORAGE SECTION.
      ****************************************************************
      *    HOST VARIABLE DECLARATION SECTION                          *
      ****************************************************************
           EXEC AISQL BEGIN DECLARE SECTION END-EXEC.
       77  DIRECTION              PIC X(10).
       77  SIGNIFICANCE           PIC X(10).
       77  EXPLANATION            PIC X(60).
       77  MESS                   PIC X(80).
       77  DECIS                  PIC X(12).
       77  RAN                    PIC X(5).
       77  INRAN                  PIC X(5).
       77  LAST-NAME              PIC X(12).
       77  APPL-NUM               PIC S9(6) COMP.
           EXEC AISQL END DECLARE SECTION END-EXEC.
           EXEC AISQL INCLUDE AISQLCA END-EXEC.
           EXEC AISQL DIMENSION (30,40,1200)
           END-EXEC.
```

```
**************************************************************
*    PROGRAM VARIABLE DECLARATION SECTION                    *
**************************************************************
  PROCEDURE DIVISION.
      EXEC AISQL CONNECT TEMP END-EXEC.
      EXEC AISQL DECLARE C0 CURSOR FOR
          SELECT "APPLICATION NUMBER" "LAST NAME"
          FROM APPLICANT INFORMATION
      END-EXEC.
      EXEC AISQL DECLARE C1 CURSOR FOR
          SELECT DIRECTION SIGNIFICANCE EXPLANATION
          FROM IMPRESSION
          ORDER BY DIRECTION
      END-EXEC.
  AGAIN.
      EXEC AISQL OPEN C0 END-EXEC.
      EXEC AISQL WHENEVER AISQLERROR GOTO AISQLERR END-EXEC.
      EXEC AISQL WHENEVER AISQLWARN CONTINUE END-EXEC.
      EXEC AISQL WHENEVER NOT FOUND GO TO NOTFND END-EXEC.
      DISPLAY 'WHICH CASE WOULD YOU LIKE TO REVIEW ?'.
  NEXTWO.
      EXEC AISQL FETCH C0
          INTO :APPL-NUM :LAST-NAME
      END-EXEC.
      DISPLAY '   ' APPL-NUM '    ' LAST-NAME.
      GO TO NEXTWO.
  NOTFND.
      EXEC AISQL WHENEVER NOT FOUND GO TO ACC END-EXEC.
      DISPLAY 'ENTER THE CASE NUMBER YOU WISH TO REVIEW'.
      DISPLAY '0 TO EXIT'.
      ACCEPT INRAN.
      IF INRAN EQUAL '0' GO TO DONE.
      EXEC AISQL SELECT "LAST NAME"
          INTO :LAST-NAME
          FROM APPLICANT INFORMATION
          WHERE APPLICATION NUMBER = :INRAN
      END-EXEC.
      EXEC AISQL WHENEVER NOT FOUND GO TO NOTFOUND END-EXEC.
      DISPLAY ' '.
      DISPLAY '-------------------------------'.
      DISPLAY '| APPLICATION NUMBER: ' INRAN ' |'.
      DISPLAY '-------------------------------'.
      DISPLAY ' '.
      EXEC AISQL UPDATE COBOL
          SET COBOL APPLICATION NUMBER = :INRAN
      END-EXEC.
      EXEC AISQL SELECT DECISION  MESSAGE
          INTO :DECIS :MESS
          FROM CONCLUSIONS
          WHERE APPLICATION NUMBER = :INRAN
      END-EXEC.
      DISPLAY 'It is recommended that we ' DECIS ' ' LAST-NAME.
      IF MESS NOT EQUAL SPACES
          DISPLAY MESS.
      DISPLAY 'This conclusion is based on the following results:'.
      EXEC AISQL OPEN C1 END-EXEC.
  NEXTONE.
      EXEC AISQL FETCH C1
          INTO :DIRECTION :SIGNIFICANCE :EXPLANATION
      END-EXEC.
```

```
    IF SIGNIFICANCE EQUAL SPACES GO TO NEXTONE.
    DISPLAY ' ' SIGNIFICANCE ' ' DIRECTION '         ' EXPLANATION.
    DISPLAY ' '.
    GO TO NEXTONE.
NOTFOUND.
    EXEC AISQL CLOSE C1 END-EXEC.
    EXEC AISQL CLOSE C0 END-EXEC.
    GO TO AGAIN.
AISQLERR.
    DISPLAY 'AISQLCODE = ' AISQLCODE.
    GO TO DONE.
ACC.
    DISPLAY 'No information available on Application ' INRAN.
    GO TO NOTFND.
WARNERR.
    DISPLAY 'WARNING'.
DONE.
    EXEC AISQL WHENEVER AISQLERROR CONTINUE END-EXEC.
    EXEC AISQL DISCONNECT END-EXEC.
    STOP RUN.
```

APPENDIX B

```
                                                               MYT00020
 IDENTIFICATION DIVISION.                                      MYT00030
 PROGRAM-ID.  SUNDAY.                                          MYT00040
 ENVIRONMENT DIVISION.                                         MYT00050
 CONFIGURATION SECTION.                                        MYT00060
 INPUT-OUTPUT SECTION.                                         MYT00070
 DATA DIVISION.                                                MYT00080
 FILE SECTION.                                                 MYT00090
 WORKING-STORAGE SECTION.                                      MYT00100
****************************************************************MYT00110
*   HOST VARIABLE DECLARATION SECTION                         * MYT00120
****************************************************************MYT00130
*****EXEC AISQL BEGIN DECLARE SECTION END-EXEC.                MYT00140
 77  DIRECTION              PIC X(10).                         MYT00150
 77  SIGNIFICANCE           PIC X(10).                         MYT00160
 77  EXPLANATION            PIC X(60).                         MYT00170
 77  MESS                   PIC X(80).                         MYT00180
 77  DECIS                  PIC X(12).                         MYT00190
 77  RAN                    PIC X(5).                          MYT00200
 77  INRAN                  PIC X(5).                          MYT00210
 77  LAST-NAME              PIC X(12).                         MYT00220
 77  APPL-NUM               PIC S9(6) COMP.                    MYT00230
*****EXEC AISQL END DECLARE SECTION END-EXEC.                  MYT00240
*****EXEC AISQL INCLUDE AISQLCA END-EXEC.                      MYT00250
*****  AISQLCA STRUCTURE FOR SQL/DATA SYSTEM .                 MYT00260
 01 AISQLCA.                                                   MYT00270
     05 AISQLCAID          PIC X(8) VALUE 'AISQLCA '.          MYT00280
     05 AISQLCABC          PIC S9(9) COMP VALUE +136.          MYT00290
     05 AISQLCODE          PIC S9(9) COMP.                     MYT00300
     05 AISQLERRM.                                             MYT00310
        49 AISQLERRML      PIC S9(4) COMP.                     MYT00320
        49 AISQLERRMC      PIC X(70).                          MYT00330
     05 AISQLERRP          PIC X(8).                           MYT00340
     05 AISQLERRD OCCURS 6 TIMES PIC S9(9) COMP.               MYT00350
     05 AISQLWARN.                                             MYT00360
        10 AISQLWARN0      PIC X(1).                           MYT00370
        10 AISQLWARN1      PIC X(1).                           MYT00380
```

```
            10  AISQLWARN2          PIC X(1).                          MYT00390
            10  AISQLWARN3          PIC X(1).                          MYT00400
            10  AISQLWARN4          PIC X(1).                          MYT00410
            10  AISQLWARN5          PIC X(1).                          MYT00420
            10  AISQLWARN6          PIC X(1).                          MYT00430
            10  AISQLWARN7          PIC X(1).                          MYT00440
            10  AISQLWARN8          PIC X(1).                          MYT00450
            10  AISQLWARN9          PIC X(1).                          MYT00460
            10  AISQLWARNA          PIC X(1).                          MYT00470
        05  AISQLEXT                PIC X(5).                          MYT00480
        05  AISQLREQ                PIC X(184).                        MYT00490
*****EXEC AISQL DIMENSION (30,40,1200)                                 MYT00500
*****END-EXEC.                                                         MYT00510
  01  AISQL-NULLPARM               PIC X(8) VALUE 'NULLPARM'.          MYT00520
  01  AISQL-APPL-ID                PIC X(4).                           MYT00530
  01  AISQL-PARMS.                                                     MYT00540
      02  AISQL-PARMS-STR OCCURS 4 TIMES.                              MYT00550
          03  AISQL-PARMS-STRING   PIC X(25).                          MYT00560
  01  AISQL-MODE                   PIC X(10).                          MYT00570
  01  AISQL-DA1-FUNCTION           PIC X(10).                          MYT00580
  01  AISQL-DIMENSION.                                                 MYT00590
      02   AISQL-STRUCT1-OCCURS    PIC S9(4) COMP VALUE +30.           MYT00600
      02   AISQL-STRUCT2-OCCURS    PIC S9(4) COMP VALUE +40.           MYT00610
      02   AISQL-COMMAND-SIZE      PIC S9(4) COMP VALUE +1200.         MYT00620
      02   AISQL-DA-WHERE-DETAILS.                                     MYT00630
          03   AISQL-STRING OCCURS 23 TIMES.                           MYT00640
              04   AISQL-COMMAND-STRING    PIC X(53).                  MYT00650
  01  AISQL-DA-STRUCT1.                                                MYT00660
      02   AISQL-DA-WHERE-ZERO.                                        MYT00670
          03   AISQL-DA1-SIZE     PIC S9(9) COMP.                      MYT00680
          03   AISQL-DA1-COUNT    PIC S9(9) COMP.                      MYT00690
      02   AISQL-DA-WHERE OCCURS 30 TIMES.                             MYT00700
          03   AISQL-TYPE-WHERE   PIC X.                               MYT00710
          03   AISQL-FLAG-WHERE   PIC X.                               MYT00720
          03   AISQL-WIDTH-WHERE  PIC S9(4) COMP.                      MYT00730
          03   AISQL-PTR-WHERE    PIC X(4).                            MYT00740
  01  AISQL-DA-STRUCT2.                                                MYT00750
      02   AISQL-DA-INTO-ZERO.                                         MYT00760
          03   AISQL-DA2-SIZE     PIC S9(9) COMP.                      MYT00770
          03   AISQL-DA2-COUNT    PIC S9(9) COMP.                      MYT00780
      02   AISQL-DA-INTO OCCURS 40 TIMES.                              MYT00790
          03   AISQL-TYPE-INTO    PIC X.                               MYT00800
          03   AISQL-FLAG-INTO    PIC X.                               MYT00810
          03   AISQL-WIDTH-INTO   PIC S9(4) COMP.                      MYT00820
          03   AISQL-PTR-INTO     PIC X(4).                            MYT00830
**************************************************************** MYT00840
*    PROGRAM VARIABLE DECLARATION SECTION                         *MYT00850
**************************************************************** MYT00860
 PROCEDURE DIVISION.                                                   MYT00870
*****EXEC AISQL CONNECT TEMP END-EXEC.                                 MYT00880
     MOVE 'CONNECT' TO AISQL-DA1-FUNCTION.                             MYT00890
     MOVE 'AISQL' TO AISQL-MODE.                                       MYT00900
     MOVE 'KBMS' TO AISQL-APPL-ID.                                     MYT00910
     MOVE 'AUTOSQL TEMP' TO AISQL-PARMS-STRING(1).                     MYT00920
     MOVE 'C' TO AISQL-TYPE-WHERE(1).                                  MYT00930
     MOVE 7 TO AISQL-WIDTH-WHERE(1).                                   MYT00940
     MOVE 'C' TO AISQL-TYPE-WHERE(2).                                  MYT00950
     MOVE 4 TO AISQL-WIDTH-WHERE(2).                                   MYT00960
     MOVE 'C' TO AISQL-TYPE-WHERE(3).                                  MYT00970
     MOVE 12 TO AISQL-WIDTH-WHERE(3).                                  MYT00980
```

```
        MOVE 'C' TO AISQL-TYPE-WHERE(4).                              MYT00990
        MOVE 5 TO AISQL-WIDTH-WHERE(4).                               MYT01000
        MOVE 4 TO AISQL-DA1-COUNT.                                    MYT01010
        MOVE 'I' TO AISQL-TYPE-INTO(1).                               MYT01020
        MOVE 4 TO AISQL-WIDTH-INTO(1).                                MYT01030
        MOVE 'C' TO AISQL-TYPE-INTO(2).                               MYT01040
        MOVE 11 TO AISQL-WIDTH-INTO(2).                               MYT01050
        MOVE 2 TO AISQL-DA2-COUNT.                                    MYT01060
        CALL 'AISQLCOB' USING                                         MYT01070
        AISQL-NULLPARM, AISQLCA, AISQL-DA-STRUCT1,                    MYT01080
        AISQL-DA-STRUCT2, AISQL-DA1-FUNCTION, AISQL-APPL-ID,          MYT01090
        AISQL-PARMS, AISQL-MODE, AISQLCODE, AISQLWARN.                MYT01100
*****THE PRECEDING COBOL SENTENCES WERE                               MYT01110
*****CREATED BY THE KBMS/COBOL SYSTEM PREPROCESSOR                    MYT01120
*****EXEC AISQL DECLARE C0 CURSOR FOR                                 MYT01130
*****     SELECT "APPLICATION NUMBER" "LAST NAME"                     MYT01140
*****     FROM APPLICANT INFORMATION                                  MYT01150
*****END-EXEC.                                                        MYT01160
        MOVE 'DECLARE C0 CURSOR FOR SELECT "APPLICATION NUMBER" "LA'  MYT01170
        TO AISQL-COMMAND-STRING(1).                                   MYT01180
        MOVE 'ST NAME" FROM APPLICANT INFORMATION '                   MYT01190
        TO AISQL-COMMAND-STRING(2).                                   MYT01200
        MOVE 'AISQL' TO AISQL-DA1-FUNCTION.                           MYT01210
        MOVE 'C' TO AISQL-TYPE-WHERE(1).                              MYT01220
        MOVE 5 TO AISQL-WIDTH-WHERE(1).                               MYT01230
        MOVE 'C' TO AISQL-TYPE-WHERE(2).                              MYT01240
        MOVE 89 TO AISQL-WIDTH-WHERE(2).                              MYT01250
        MOVE 'C' TO AISQL-TYPE-WHERE(3).                              MYT01260
        MOVE 24 TO AISQL-WIDTH-WHERE(3).                              MYT01270
        MOVE 3 TO AISQL-DA1-COUNT.                                    MYT01280
        MOVE 'I' TO AISQL-TYPE-INTO(1).                               MYT01290
        MOVE 4 TO AISQL-WIDTH-INTO(1).                                MYT01300
        MOVE 'C' TO AISQL-TYPE-INTO(2).                               MYT01310
        MOVE 11 TO AISQL-WIDTH-INTO(2).                               MYT01320
        MOVE 2 TO AISQL-DA2-COUNT.                                    MYT01330
        CALL 'AISQLCOB' USING                                         MYT01340
        AISQL-NULLPARM, AISQLCA, AISQL-DA-STRUCT1,                    MYT01350
        AISQL-DA-STRUCT2, AISQL-DA1-FUNCTION,                         MYT01360
        AISQL-DA-WHERE-DETAILS, AISQL-DA-STRUCT2, AISQLCODE,          MYT01370
        AISQLWARN.                                                    MYT01380
*****THE PRECEDING COBOL SENTENCES WERE                               MYT01390
*****CREATED BY THE KBMS/COBOL SYSTEM PREPROCESSOR                    MYT01400
*****EXEC AISQL DECLARE C1 CURSOR FOR                                 MYT01410
*****     SELECT DIRECTION SIGNIFICANCE EXPLANATION                   MYT01420
*****     FROM IMPRESSION                                             MYT01430
*****     ORDER BY DIRECTION                                          MYT01440
*****END-EXEC.                                                        MYT01450
        MOVE 'DECLARE C1 CURSOR FOR SELECT DIRECTION SIGNIFICANCE E'  MYT01460
        TO AISQL-COMMAND-STRING(1).                                   MYT01470
        MOVE 'XPLANATION FROM IMPRESSION ORDER BY DIRECTION '         MYT01480
        TO AISQL-COMMAND-STRING(2).                                   MYT01490
        MOVE 'AISQL' TO AISQL-DA1-FUNCTION.                           MYT01500
        MOVE 'C' TO AISQL-TYPE-WHERE(1).                              MYT01510
        MOVE 5 TO AISQL-WIDTH-WHERE(1).                               MYT01520
        MOVE 'C' TO AISQL-TYPE-WHERE(2).                              MYT01530
        MOVE 99 TO AISQL-WIDTH-WHERE(2).                              MYT01540
        MOVE 'C' TO AISQL-TYPE-WHERE(3).                              MYT01550
        MOVE 24 TO AISQL-WIDTH-WHERE(3).                              MYT01560
        MOVE 3 TO AISQL-DA1-COUNT.                                    MYT01570
        MOVE 'I' TO AISQL-TYPE-INTO(1).                               MYT01580
```

```
      MOVE 4 TO AISQL-WIDTH-INTO(1).                              MYT01590
      MOVE 'C' TO AISQL-TYPE-INTO(2).                             MYT01600
      MOVE 11 TO AISQL-WIDTH-INTO(2).                             MYT01610
      MOVE 2 TO AISQL-DA2-COUNT.                                  MYT01620
      CALL 'AISQLCOB' USING                                       MYT01630
      AISQL-NULLPARM, AISQLCA, AISQL-DA-STRUCT1,                  MYT01640
      AISQL-DA-STRUCT2, AISQL-DA1-FUNCTION,                       MYT01650
      AISQL-DA-WHERE-DETAILS, AISQL-DA-STRUCT2, AISQLCODE,        MYT01660
      AISQLWARN.                                                  MYT01670
*****THE PRECEDING COBOL SENTENCES WERE                           MYT01680
*****CREATED BY THE KBMS/COBOL SYSTEM PREPROCESSOR                MYT01690
 AGAIN.                                                           MYT01700
*****EXEC AISQL OPEN C0 END-EXEC.                                 MYT01710
      MOVE 'OPEN C0 '                                             MYT01720
      TO AISQL-COMMAND-STRING(1).                                 MYT01730
      MOVE 'AISQL' TO AISQL-DA1-FUNCTION.                         MYT01740
      MOVE 'C' TO AISQL-TYPE-WHERE(1).                            MYT01750
      MOVE 5 TO AISQL-WIDTH-WHERE(1).                             MYT01760
      MOVE 'C' TO AISQL-TYPE-WHERE(2).                            MYT01770
      MOVE 8 TO AISQL-WIDTH-WHERE(2).                             MYT01780
      MOVE 'C' TO AISQL-TYPE-WHERE(3).                            MYT01790
      MOVE 24 TO AISQL-WIDTH-WHERE(3).                            MYT01800
      MOVE 3 TO AISQL-DA1-COUNT.                                  MYT01810
      MOVE 'I' TO AISQL-TYPE-INTO(1).                             MYT01820
      MOVE 4 TO AISQL-WIDTH-INTO(1).                              MYT01830
      MOVE 'C' TO AISQL-TYPE-INTO(2).                             MYT01840
      MOVE 11 TO AISQL-WIDTH-INTO(2).                             MYT01850
      MOVE 2 TO AISQL-DA2-COUNT.                                  MYT01860
      CALL 'AISQLCOB' USING                                       MYT01870
      AISQL-NULLPARM, AISQLCA, AISQL-DA-STRUCT1,                  MYT01880
      AISQL-DA-STRUCT2, AISQL-DA1-FUNCTION,                       MYT01890
      AISQL-DA-WHERE-DETAILS, AISQL-DA-STRUCT2, AISQLCODE,        MYT01900
      AISQLWARN.                                                  MYT01910
*****THE PRECEDING COBOL SENTENCES WERE                           MYT01920
*****CREATED BY THE KBMS/COBOL SYSTEM PREPROCESSOR                MYT01930
*****EXEC AISQL WHENEVER AISQLERROR GOTO AISQLERR END-EXEC.       MYT01940
*****EXEC AISQL WHENEVER AISQLWARN CONTINUE END-EXEC.             MYT01950
*****EXEC AISQL WHENEVER NOT FOUND GO TO NOTFND END-EXEC.         MYT01960
      DISPLAY 'WHICH CASE WOULD YOU LIKE TO REVIEW ?'.            MYT01970
 NEXTWO.                                                          MYT01980
*****EXEC AISQL FETCH C0                                          MYT01990
*****     INTO :APPL-NUM :LAST-NAME                               MYT02000
*****END-EXEC.                                                    MYT02010
      MOVE 'FETCH C0'                                             MYT02020
      TO AISQL-COMMAND-STRING(1).                                 MYT02030
      MOVE 'AISQL' TO AISQL-DA1-FUNCTION.                         MYT02040
      MOVE 'C' TO AISQL-TYPE-WHERE(1).                            MYT02050
      MOVE 5 TO AISQL-WIDTH-WHERE(1).                             MYT02060
      MOVE 'C' TO AISQL-TYPE-WHERE(2).                            MYT02070
      MOVE 8 TO AISQL-WIDTH-WHERE(2).                             MYT02080
      MOVE 'C' TO AISQL-TYPE-WHERE(3).                            MYT02090
      MOVE 40 TO AISQL-WIDTH-WHERE(3).                            MYT02100
      MOVE 3 TO AISQL-DA1-COUNT.                                  MYT02110
      MOVE 'I' TO AISQL-TYPE-INTO(1).                             MYT02120
      MOVE 4 TO AISQL-WIDTH-INTO(1).                              MYT02130
      MOVE 'C' TO AISQL-TYPE-INTO(2).                             MYT02140
      MOVE 11 TO AISQL-WIDTH-INTO(2).                             MYT02150
      MOVE 'I' TO AISQL-TYPE-INTO(3).                             MYT02160
      MOVE 4 TO AISQL-WIDTH-INTO(3).                              MYT02170
      MOVE 'C' TO AISQL-TYPE-INTO(4).                             MYT02180
```

```
         MOVE 12 TO AISQL-WIDTH-INTO(4).                          MYT02190
         MOVE 4 TO AISQL-DA2-COUNT.                               MYT02200
         CALL 'AISQLCOB' USING                                    MYT02210
         AISQL-NULLPARM, AISQLCA, AISQL-DA-STRUCT1,               MYT02220
         AISQL-DA-STRUCT2, AISQL-DA1-FUNCTION,                    MYT02230
         AISQL-DA-WHERE-DETAILS, AISQL-DA-STRUCT2, AISQLCODE,     MYT02240
         AISQLWARN, APPL-NUM, LAST-NAME.                          MYT02250
         IF AISQLCODE = 100 GO TO NOTFND.                         MYT02260
         IF AISQLCODE NOT EQUAL 0 GO TO AISQLERR.                 MYT02270
*****THE PRECEDING COBOL SENTENCES WERE                           MYT02280
*****CREATED BY THE KBMS/COBOL SYSTEM PREPROCESSOR                MYT02290
         DISPLAY ' ' APPL-NUM ' ' LAST-NAME.                      MYT02300
         GO TO NEXTWO.                                            MYT02310
     NOTFND.                                                      MYT02320
*****EXEC AISQL WHENEVER NOT FOUND GO TO ACC END-EXEC.            MYT02330
         DISPLAY 'ENTER THE CASE NUMBER YOU WISH TO REVIEW'.      MYT02340
         DISPLAY '0 TO EXIT'.                                     MYT02350
         ACCEPT INRAN.                                            MYT02360
         IF INRAN EQUAL '0' GO TO DONE.                           MYT02370
*****EXEC AISQL SELECT "LAST NAME"                                MYT02380
*****       INTO :LAST-NAME                                       MYT02390
*****       FROM APPLICANT INFORMATION                            MYT02400
*****       WHERE APPLICATION NUMBER = :INRAN                     MYT02410
*****END-EXEC.                                                    MYT02420
         MOVE 'SELECT "LAST NAME" FROM APPLICANT INFORMATION WHERE A' MYT02430
         TO AISQL-COMMAND-STRING(1).                              MYT02440
         MOVE 'PPLICATION NUMBER = :?N '                          MYT02450
         TO AISQL-COMMAND-STRING(2).                              MYT02460
         MOVE 'AISQL' TO AISQL-DA1-FUNCTION.                      MYT02470
         MOVE 'C' TO AISQL-TYPE-WHERE(1).                         MYT02480
         MOVE 5 TO AISQL-WIDTH-WHERE(1).                          MYT02490
         MOVE 'C' TO AISQL-TYPE-WHERE(2).                         MYT02500
         MOVE 77 TO AISQL-WIDTH-WHERE(2).                         MYT02510
         MOVE 'C' TO AISQL-TYPE-WHERE(3).                         MYT02520
         MOVE 5 TO AISQL-WIDTH-WHERE(3).                          MYT02530
         MOVE 'C' TO AISQL-TYPE-WHERE(4).                         MYT02540
         MOVE 32 TO AISQL-WIDTH-WHERE(4).                         MYT02550
         MOVE 4 TO AISQL-DA1-COUNT.                               MYT02560
         MOVE 'I' TO AISQL-TYPE-INTO(1).                          MYT02570
         MOVE 4 TO AISQL-WIDTH-INTO(1).                           MYT02580
         MOVE 'C' TO AISQL-TYPE-INTO(2).                          MYT02590
         MOVE 11 TO AISQL-WIDTH-INTO(2).                          MYT02600
         MOVE 'C' TO AISQL-TYPE-INTO(3).                          MYT02610
         MOVE 12 TO AISQL-WIDTH-INTO(3).                          MYT02620
         MOVE 3 TO AISQL-DA2-COUNT.                               MYT02630
         CALL 'AISQLCOB' USING                                    MYT02640
         AISQL-NULLPARM, AISQLCA, AISQL-DA-STRUCT1,               MYT02650
         AISQL-DA-STRUCT2, AISQL-DA1-FUNCTION,                    MYT02660
         AISQL-DA-WHERE-DETAILS, INRAN, AISQL-DA-STRUCT2,         MYT02670
         AISQLCODE, AISQLWARN, LAST-NAME.                         MYT02680
         IF AISQLCODE = 100 GO TO ACC.                            MYT02690
         IF AISQLCODE NOT EQUAL 0 GO TO AISQLERR.                 MYT02700
*****THE PRECEDING COBOL SENTENCES WERE                           MYT02710
*****CREATED BY THE KBMS/COBOL SYSTEM PREPROCESSOR                MYT02720
*****EXEC AISQL WHENEVER NOT FOUND GO TO NOTFOUND END-EXEC.       MYT02730
         DISPLAY ' '.                                             MYT02740
         DISPLAY '-----------------------------------'.           MYT02750
         DISPLAY '| APPLICATION NUMBER: ' INRAN ' |'.             MYT02760
         DISPLAY '-----------------------------------'.           MYT02770
         DISPLAY ' '.                                             MYT02780
```

```
*****EXEC AISQL UPDATE COBOL                                            MYT02790
*****     SET COBOL APPLICATION NUMBER = :INRAN                         MYT02800
*****END-EXEC.                                                          MYT02810
      MOVE 'UPDATE COBOL SET COBOL APPLICATION NUMBER = :?N '           MYT02820
      TO AISQL-COMMAND-STRING(1).                                       MYT02830
      MOVE 'AISQL' TO AISQL-DA1-FUNCTION.                               MYT02840
      MOVE 'C' TO AISQL-TYPE-WHERE(1).                                  MYT02850
      MOVE 5 TO AISQL-WIDTH-WHERE(1).                                   MYT02860
      MOVE 'C' TO AISQL-TYPE-WHERE(2).                                  MYT02870
      MOVE 48 TO AISQL-WIDTH-WHERE(2).                                  MYT02880
      MOVE 'C' TO AISQL-TYPE-WHERE(3).                                  MYT02890
      MOVE 5 TO AISQL-WIDTH-WHERE(3).                                   MYT02900
      MOVE 'C' TO AISQL-TYPE-WHERE(4).                                  MYT02910
      MOVE 24 TO AISQL-WIDTH-WHERE(4).                                  MYT02920
      MOVE 4 TO AISQL-DA1-COUNT.                                        MYT02930
      MOVE 'I' TO AISQL-TYPE-INTO(1).                                   MYT02940
      MOVE 4 TO AISQL-WIDTH-INTO(1).                                    MYT02950
      MOVE 'C' TO AISQL-TYPE-INTO(2).                                   MYT02960
      MOVE 11 TO AISQL-WIDTH-INTO(2).                                   MYT02970
      MOVE 2 TO AISQL-DA2-COUNT.                                        MYT02980
      CALL 'AISQLCOB' USING                                             MYT02990
      AISQL-NULLPARM, AISQLCA, AISQL-DA-STRUCT1,                        MYT03000
      AISQL-DA-STRUCT2, AISQL-DA1-FUNCTION,                             MYT03010
      AISQL-DA-WHERE-DETAILS, INRAN, AISQL-DA-STRUCT2,                  MYT03020
      AISQLCODE, AISQLWARN.                                             MYT03030
      IF AISQLCODE = 100 GO TO NOTFOUND.                                MYT03040
      IF AISQLCODE NOT EQUAL 0 GO TO AISQLERR.                          MYT03050
*****THE PRECEDING COBOL SENTENCES WERE                                 MYT03060
*****CREATED BY THE KBMS/COBOL SYSTEM PREPROCESSOR                      MYT03070
*****EXEC AISQL SELECT DECISION  MESSAGE                                MYT03080
*****     INTO :DECIS :MESS                                             MYT03090
*****     FROM CONCLUSIONS                                              MYT03100
*****     WHERE APPLICATION NUMBER = :INRAN                             MYT03110
*****END-EXEC.                                                          MYT03120
      MOVE 'SELECT DECISION MESSAGE FROM CONCLUSIONS WHERE APPLIC'      MYT03130
      TO AISQL-COMMAND-STRING(1).                                       MYT03140
      MOVE 'ATION NUMBER = :?N '                                        MYT03150
      TO AISQL-COMMAND-STRING(2).                                       MYT03160
      MOVE 'AISQL' TO AISQL-DA1-FUNCTION.                               MYT03170
      MOVE 'C' TO AISQL-TYPE-WHERE(1).                                  MYT03180
      MOVE 5 TO AISQL-WIDTH-WHERE(1).                                   MYT03190
      MOVE 'C' TO AISQL-TYPE-WHERE(2).                                  MYT03200
      MOVE 72 TO AISQL-WIDTH-WHERE(2).                                  MYT03210
      MOVE 'C' TO AISQL-TYPE-WHERE(3).                                  MYT03220
      MOVE 5 TO AISQL-WIDTH-WHERE(3).                                   MYT03230
      MOVE 'C' TO AISQL-TYPE-WHERE(4).                                  MYT03240
      MOVE 40 TO AISQL-WIDTH-WHERE(4).                                  MYT03250
      MOVE 4 TO AISQL-DA1-COUNT.                                        MYT03260
      MOVE 'I' TO AISQL-TYPE-INTO(1).                                   MYT03270
      MOVE 4 TO AISQL-WIDTH-INTO(1).                                    MYT03280
      MOVE 'C' TO AISQL-TYPE-INTO(2).                                   MYT03290
      MOVE 11 TO AISQL-WIDTH-INTO(2).                                   MYT03300
      MOVE 'C' TO AISQL-TYPE-INTO(3).                                   MYT03310
      MOVE 12 TO AISQL-WIDTH-INTO(3).                                   MYT03320
      MOVE 'C' TO AISQL-TYPE-INTO(4).                                   MYT03330
      MOVE 80 TO AISQL-WIDTH-INTO(4).                                   MYT03340
      MOVE 4 TO AISQL-DA2-COUNT.                                        MYT03350
      CALL 'AISQLCOB' USING                                             MYT03360
      AISQL-NULLPARM, AISQLCA, AISQL-DA-STRUCT1,                        MYT03370
      AISQL-DA-STRUCT2, AISQL-DA1-FUNCTION,                             MYT03380
```

```
    AISQL-DA-WHERE-DETAILS,  INRAN,  AISQL-DA-STRUCT2,           MYT03390
    AISQLCODE,  AISQLWARN,  DECIS,  MESS.                        MYT03400
    IF AISQLCODE = 100 GO TO NOTFOUND.                           MYT03410
    IF AISQLCODE NOT EQUAL 0 GO TO AISQLERR.                     MYT03420
****THE PRECEDING COBOL SENTENCES WERE                           MYT03430
****CREATED BY THE KBMS/COBOL SYSTEM PREPROCESSOR                MYT03440
    DISPLAY 'It is recommended that we ' DECIS ' ' LAST-NAME.    MYT03450
    IF MESS NOT EQUAL SPACES                                     MYT03460
        DISPLAY MESS.                                            MYT03470
    DISPLAY 'This conclusion is based on the following results:'.MYT03480
****EXEC AISQL OPEN C1 END-EXEC.                                 MYT03490
    MOVE 'OPEN C1 '                                              MYT03500
    TO AISQL-COMMAND-STRING(1).                                  MYT03510
    MOVE 'AISQL' TO AISQL-DA1-FUNCTION.                          MYT03520
    MOVE 'C' TO AISQL-TYPE-WHERE(1).                             MYT03530
    MOVE 5 TO AISQL-WIDTH-WHERE(1).                              MYT03540
    MOVE 'C' TO AISQL-TYPE-WHERE(2).                             MYT03550
    MOVE 8 TO AISQL-WIDTH-WHERE(2).                              MYT03560
    MOVE 'C' TO AISQL-TYPE-WHERE(3).                             MYT03570
    MOVE 24 TO AISQL-WIDTH-WHERE(3).                             MYT03580
    MOVE 3 TO AISQL-DA1-COUNT.                                   MYT03590
    MOVE 'I' TO AISQL-TYPE-INTO(1).                              MYT03600
    MOVE 4 TO AISQL-WIDTH-INTO(1).                               MYT03610
    MOVE 'C' TO AISQL-TYPE-INTO(2).                              MYT03620
    MOVE 11 TO AISQL-WIDTH-INTO(2).                              MYT03630
    MOVE 2 TO AISQL-DA2-COUNT.                                   MYT03640
    CALL 'AISQLCOB' USING                                        MYT03650
    AISQL-NULLPARM, AISQLCA, AISQL-DA-STRUCT1,                   MYT03660
    AISQL-DA-STRUCT2,  AISQL-DA1-FUNCTION,                       MYT03670
    AISQL-DA-WHERE-DETAILS, AISQL-DA-STRUCT2, AISQLCODE,         MYT03680
    AISQLWARN.                                                   MYT03690
    IF AISQLCODE = 100 GO TO NOTFOUND.                           MYT03700
    IF AISQLCODE NOT EQUAL 0 GO TO AISQLERR.                     MYT03710
****THE PRECEDING COBOL SENTENCES WERE                           MYT03720
****CREATED BY THE KBMS/COBOL SYSTEM PREPROCESSOR                MYT03730
NEXTONE.                                                         MYT03740
****EXEC AISQL FETCH C1                                          MYT03750
****     INTO :DIRECTION :SIGNIFICANCE :EXPLANATION              MYT03760
****END-EXEC.                                                    MYT03770
    MOVE 'FETCH C1'                                              MYT03780
    TO AISQL-COMMAND-STRING(1).                                  MYT03790
    MOVE 'AISQL' TO AISQL-DA1-FUNCTION.                          MYT03800
    MOVE 'C' TO AISQL-TYPE-WHERE(1).                             MYT03810
    MOVE 5 TO AISQL-WIDTH-WHERE(1).                              MYT03820
    MOVE 'C' TO AISQL-TYPE-WHERE(2).                             MYT03830
    MOVE 8 TO AISQL-WIDTH-WHERE(2).                              MYT03840
    MOVE 'C' TO AISQL-TYPE-WHERE(3).                             MYT03850
    MOVE 48 TO AISQL-WIDTH-WHERE(3).                             MYT03860
    MOVE 3 TO AISQL-DA1-COUNT.                                   MYT03870
    MOVE 'I' TO AISQL-TYPE-INTO(1).                              MYT03880
    MOVE 4 TO AISQL-WIDTH-INTO(1).                               MYT03890
    MOVE 'C' TO AISQL-TYPE-INTO(2).                              MYT03900
    MOVE 11 TO AISQL-WIDTH-INTO(2).                              MYT03910
    MOVE 'C' TO AISQL-TYPE-INTO(3).                              MYT03920
    MOVE 10 TO AISQL-WIDTH-INTO(3).                              MYT03930
    MOVE 'C' TO AISQL-TYPE-INTO(4).                              MYT03940
    MOVE 10 TO AISQL-WIDTH-INTO(4).                              MYT03950
    MOVE 'C' TO AISQL-TYPE-INTO(5).                              MYT03960
    MOVE 60 TO AISQL-WIDTH-INTO(5).                              MYT03970
    MOVE 5 TO AISQL-DA2-COUNT.                                   MYT03980
```

```
      CALL 'AISQLCOB' USING                                     MYT03990
      AISQL-NULLPARM, AISQLCA, AISQL-DA-STRUCT1,                MYT04000
      AISQL-DA-STRUCT2, AISQL-DA1-FUNCTION,                     MYT04010
      AISQL-DA-WHERE-DETAILS, AISQL-DA-STRUCT2, AISQLCODE,      MYT04020
      AISQLWARN, DIRECTION, SIGNIFICANCE, EXPLANATION.          MYT04030
      IF AISQLCODE = 100 GO TO NOTFOUND.                        MYT04040
      IF AISQLCODE NOT EQUAL 0 GO TO AISQLERR.                  MYT04050
*****THE PRECEDING COBOL SENTENCES WERE                         MYT04060
*****CREATED BY THE KBMS/COBOL SYSTEM PREPROCESSOR              MYT04070
      IF SIGNIFICANCE EQUAL SPACES GO TO NEXTONE.               MYT04080
      DISPLAY ' ' SIGNIFICANCE ' ' DIRECTION '     ' EXPLANATION. MYT04090
      DISPLAY ' '.                                              MYT04100
      GO TO NEXTONE.                                            MYT04110
  NOTFOUND.                                                     MYT04120
*****EXEC AISQL CLOSE C1 END-EXEC.                              MYT04130
      MOVE 'CLOSE C1 '                                          MYT04140
      TO AISQL-COMMAND-STRING(1).                               MYT04150
      MOVE 'AISQL' TO AISQL-DA1-FUNCTION.                       MYT04160
      MOVE 'C' TO AISQL-TYPE-WHERE(1).                          MYT04170
      MOVE 5 TO AISQL-WIDTH-WHERE(1).                           MYT04180
      MOVE 'C' TO AISQL-TYPE-WHERE(2).                          MYT04190
      MOVE 9 TO AISQL-WIDTH-WHERE(2).                           MYT04200
      MOVE 'C' TO AISQL-TYPE-WHERE(3).                          MYT04210
      MOVE 24 TO AISQL-WIDTH-WHERE(3).                          MYT04220
      MOVE 3 TO AISQL-DA1-COUNT.                                MYT04230
      MOVE 'I' TO AISQL-TYPE-INTO(1).                           MYT04240
      MOVE 4 TO AISQL-WIDTH-INTO(1).                            MYT04250
      MOVE 'C' TO AISQL-TYPE-INTO(2).                           MYT04260
      MOVE 11 TO AISQL-WIDTH-INTO(2).                           MYT04270
      MOVE 2 TO AISQL-DA2-COUNT.                                MYT04280
      CALL 'AISQLCOB' USING                                     MYT04290
      AISQL-NULLPARM, AISQLCA, AISQL-DA-STRUCT1,                MYT04300
      AISQL-DA-STRUCT2, AISQL-DA1-FUNCTION,                     MYT04310
      AISQL-DA-WHERE-DETAILS, AISQL-DA-STRUCT2, AISQLCODE,      MYT04320
      AISQLWARN.                                                MYT04330
      IF AISQLCODE = 100 GO TO NOTFOUND.                        MYT04340
      IF AISQLCODE NOT EQUAL 0 GO TO AISQLERR.                  MYT04350
*****THE PRECEDING COBOL SENTENCES WERE                         MYT04360
*****CREATED BY THE KBMS/COBOL SYSTEM PREPROCESSOR              MYT04370
*****EXEC AISQL CLOSE C0 END-EXEC.                              MYT04380
      MOVE 'CLOSE C0 '                                          MYT04390
      TO AISQL-COMMAND-STRING(1).                               MYT04400
      MOVE 'AISQL' TO AISQL-DA1-FUNCTION.                       MYT04410
      MOVE 'C' TO AISQL-TYPE-WHERE(1).                          MYT04420
      MOVE 5 TO AISQL-WIDTH-WHERE(1).                           MYT04430
      MOVE 'C' TO AISQL-TYPE-WHERE(2).                          MYT04440
      MOVE 9 TO AISQL-WIDTH-WHERE(2).                           MYT04450
      MOVE 'C' TO AISQL-TYPE-WHERE(3).                          MYT04460
      MOVE 24 TO AISQL-WIDTH-WHERE(3).                          MYT04470
      MOVE 3 TO AISQL-DA1-COUNT.                                MYT04480
      MOVE 'I' TO AISQL-TYPE-INTO(1).                           MYT04490
      MOVE 4 TO AISQL-WIDTH-INTO(1).                            MYT04500
      MOVE 'C' TO AISQL-TYPE-INTO(2).                           MYT04510
      MOVE 11 TO AISQL-WIDTH-INTO(2).                           MYT04520
      MOVE 2 TO AISQL-DA2-COUNT.                                MYT04530
      CALL 'AISQLCOB' USING                                     MYT04540
      AISQL-NULLPARM, AISQLCA, AISQL-DA-STRUCT1,                MYT04550
      AISQL-DA-STRUCT2, AISQL-DA1-FUNCTION,                     MYT04560
      AISQL-DA-WHERE-DETAILS, AISQL-DA-STRUCT2, AISQLCODE,      MYT04570
      AISQLWARN.                                                MYT04580
```

```
        IF AISQLCODE = 100 GO TO NOTFOUND.                        MYT04590
        IF AISQLCODE NOT EQUAL 0 GO TO AISQLERR.                  MYT04600
****THE PRECEDING COBOL SENTENCES WERE                            MYT04610
****CREATED BY THE KBMS/COBOL SYSTEM PREPROCESSOR                 MYT04620
        GO TO AGAIN.                                              MYT04630
AISQLERR.                                                         MYT04640
        DISPLAY 'AISQLCODE = ' AISQLCODE.                         MYT04650
        GO TO DONE.                                               MYT04660
ACC.                                                              MYT04670
        DISPLAY 'No information available on Application ' INRAN. MYT04680
        GO TO NOTFND.                                             MYT04690
WARNERR.                                                          MYT04700
        DISPLAY 'WARNING'.                                        MYT04710
DONE.                                                             MYT04720
****EXEC AISQL WHENEVER AISQLERROR CONTINUE END-EXEC.             MYT04730
****EXEC AISQL DISCONNECT END-EXEC.                               MYT04740
        MOVE 'DISCONNECT' TO AISQL-DA1-FUNCTION.                  MYT04750
        MOVE 'C' TO AISQL-TYPE-WHERE(1).                          MYT04760
        MOVE 10 TO AISQL-WIDTH-WHERE(1).                          MYT04770
        MOVE 1 TO AISQL-DA1-COUNT.                                MYT04780
        MOVE 'I' TO AISQL-TYPE-INTO(1).                           MYT04790
        MOVE 4 TO AISQL-WIDTH-INTO(1).                            MYT04800
        MOVE 'C' TO AISQL-TYPE-INTO(2).                           MYT04810
        MOVE 11 TO AISQL-WIDTH-INTO(2).                           MYT04820
        MOVE 2 TO AISQL-DA2-COUNT.                                MYT04830
        CALL 'AISQLCOB' USING                                     MYT04840
        AISQL-NULLPARM, AISQLCA, AISQL-DA-STRUCT1,                MYT04850
        AISQL-DA-STRUCT2, AISQL-DA1-FUNCTION, AISQLCODE,          MYT04860
        AISQLWARN.                                                MYT04870
        IF AISQLCODE = 100 GO TO NOTFOUND.                        MYT04880
****THE PRECEDING COBOL SENTENCES WERE                            MYT04890
****CREATED BY THE KBMS/COBOL SYSTEM PREPROCESSOR                 MYT04900
        STOP RUN.                                                 MYT04910
```

What is claimed is:

1. A method for enabling an inference engine in a knowledge base system to test the "if (condition)" portion of a rule which refers to a class of facts, comprising
    prior to testing said condition, storing information identifying data storage associated with each said class of facts,
    when a class is named in said "if (condition)" portion of said rule, causing said inference engine to execute a sequence of steps directed to retrieval of said facts, said steps being selected based on said class, and on said information identifying said associated data storage.

2. A method for controlling retrieval of facts temporarily needed by an inference engine of a knowledge base system, said facts being available in an external data base in which said facts are stored in conjunction with other, unneeded facts, said inference engine having an associated temporary storage space for storing said temporarily needed facts after retrieval from said data base, said method comprising
    fetching from said data base said needed facts and other unneeded facts,
    filtering said facts to exclude said unneeded facts, and only after completion of said filtering, transducing said needed facts into said temporary storage space.

3. The method of claim 2 wherein said fetching comprises providing a path through which said needed and unneeded facts are initially passed.

4. The method of claim 2 wherein said filtering comprises excluding all facts except that fact whose value of a specified attribute has not yet occurred in any other fact.

5. The method of claim 3 wherein said fetching comprises providing two paths through which said needed and unneeded facts are initially passed.

6. The method of claim 5 wherein said filtering comprises excluding all facts except those facts having the same attributes in each path.

7. A method for controlling retrieval of facts temporarily needed by an inference engine of a knowledge base system, said facts being available in record locations of an external data base, said inference engine having an associated temporary storage space for storing said temporarily needed facts after retrieval from said data base, said data base being managed by a data base management system which includes a pointer control mechanism for pointing to record locations, said method comprising
    causing said knowledge base system to exercise control of said pointer control mechanism to retrieve said facts one by one from said data base as needed by said inference engine, and
    transducing said facts into said temporary storage space after said facts are retrieved.

8. The method of claim 7 wherein said control comprises initializing said pointer control mechanism to the first record location, incrementing said pointer control mechanism to said successive record locations, and terminating said pointer control mechanism after retrieving the last of said facts.

9. A method for enabling an inference engine in a knowledge base system to test the "if (condition)" portion of a rule which refers to a class of facts, comprising prior to testing said condition, storing information identifying data storage associated with each said class of facts, when a class is named in said "if (condition)" portion of said rule, causing said inference engine to execute a sequence of steps directed to retrieval of said facts, said steps begin selected based on said class, and on said information identifying said associated data storage, said method being adapted for use where one said data storage comprises storage, in an external data base, of a class of facts which is to be used only temporarily by said inference engine, and said sequence of steps if part of a network of steps which enable retrieval of facts corresponding to each node of said knowledge base system, said method further comprising organizing said steps in said network by clustering together steps which involve retrieval of facts from said external data base.

10. A method for enabling an inference engine in a knowledge base system to test the "if (condition)" portion of a rule which refers to a class of facts, comprising prior to testing said condition, storing information identifying data storage associated with each said class of facts, when a class is named in said "if (condition)" portion of said rule, causing said inference engine to execute a sequence of steps directed to retrieval of said facts, said steps being selected based on said class, and on said information identifying said associated data storage, said method adapted for use where one said data storage comprises storage, in an external data base, of a class of facts which is to be used only temporarily by said inference engine, and said sequence of steps is part of a network of steps which enable retrieval of facts corresponding to each node of said knowledge base system, said method further comprising organizing said steps in said network to defer the execution of steps which cause retrieval of facts from said external data base until other steps required for testing the "if (condition)" portion of said rule have been executed.

* * * * *

UNITED STATES PATENT AND TRADEMARK OFFICE
CERTIFICATE OF CORRECTION

PATENT NO.   : 5,228,116

DATED        : July 13, 1993

INVENTOR(S)  : Larry R. Harris et al.

It is certified that error appears in the above-identified patent and that said Letters Patent is hereby corrected as shown below:

On title page, item [56]

In references cited, "4,095,982" should be --4,595,982--.

Col. 7, line 31; "Y" should be --X--.

Col. 7, line 58; "Ret" should be --Rete--.

Signed and Sealed this

Sixteenth Day of August, 1994

Attest:

BRUCE LEHMAN

Attesting Officer          Commissioner of Patents and Trademarks